United States Patent
Turner et al.

(10) Patent No.: US 12,367,451 B2
(45) Date of Patent: Jul. 22, 2025

(54) INTEGRATED LOGISTICS ECOSYSTEM

(71) Applicant: United States Postal Service, Washington, DC (US)

(72) Inventors: Alison Frankowski Turner, Arlington, VA (US); Farah Bandukwala, Herndon, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 18/470,898

(22) Filed: Sep. 20, 2023

(65) Prior Publication Data

US 2024/0095658 A1    Mar. 21, 2024

Related U.S. Application Data

(60) Provisional application No. 63/376,334, filed on Sep. 20, 2022.

(51) Int. Cl.
*G06Q 10/0835*    (2023.01)
*G06Q 10/0833*    (2023.01)

(52) U.S. Cl.
CPC ...  *G06Q 10/08355* (2013.01); *G06Q 10/0833* (2013.01)

(58) Field of Classification Search
CPC ............. G06Q 10/08355; G06Q 10/0833
See application file for complete search history.

(56) References Cited

U.S. PATENT DOCUMENTS

| | | | | |
|---|---|---|---|---|
| 2016/0042321 A1* | 2/2016 | Held | ............... | G06Q 10/08355 705/338 |
| 2021/0158276 A1* | 5/2021 | Helvie | ................... | G06Q 30/02 |
| 2021/0312722 A1* | 10/2021 | Nakashima | ........... | G06Q 10/047 |
| 2022/0076193 A1* | 3/2022 | Chen | ..................... | G06Q 50/40 |
| 2023/0139933 A1* | 5/2023 | Tam | ....................... | G06Q 50/40 701/26 |

OTHER PUBLICATIONS

F. Reclus and K. Drouard, "Geofencing for fleet & freight management," 2009 9th International Conference on Intelligent Transport Systems Telecommunications, (ITST), Lille, France, 2009, pp. 353-356, doi: 10.1109/ITST.2009.5399328. (Year: 2009).*

* cited by examiner

*Primary Examiner* — Resha Desai
*Assistant Examiner* — Danielle Elizabeth Zevitz
(74) *Attorney, Agent, or Firm* — Knobbe, Martens, Olson & Bear, LLP

(57) ABSTRACT

The integrated logistics ecosystem is a hybrid system for creating datasets and services that are utilized in a logistics network. This system provides an inventory of data objects, access layers, and services which perform across various tenants of the system. These tenants may be made up of several architectural components such as transportation management, freight payment, integrated GPS, transportation visibility, logistics gateway, contract management system, freight auction, fuel management, surface visibility, workforce management, and integrated control tower components. Each of these is integrated into the system as a whole to ensure dynamic communication and process execution.

18 Claims, 17 Drawing Sheets

INTEGRATED LOGISTICS ECOSYSTEM

INCORPORATION BY REFERENCE OF ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of U.S. Provisional Application Ser. No. 63/376,334, filed Sep. 20, 2022, entitled "Integrated Logistics Ecosystem," the entirety of which is incorporated by reference herein.

BACKGROUND

Logistics networks are made up of systems and related subsystems that handle and oversee different aspects of a network. Such networks may include processing facilities, transportation management, shipping etc. These networks are often complex and not configured to handle changing parameters within a given system, much less the effects of a changing parameter of one system on another system. Further, parts of these networks may be outsourced to vendors which may handle a specific part of the system. Many systems are outdated and require manual input and oversight to operate. Such systems operate in a static manner and don't have a way to communicate, in real time, to the other parts of the system or network. This leads to inefficiencies in the subsystem as well as the network as a whole. As such, a need exists for a logistics ecosystem with integrated components that dynamically interact with one another and reduce the amount of manual input to operate.

SUMMARY

For purposes of summarizing the disclosure and the advantages achieved over the prior art, certain objects and advantages of the disclosure are described herein. Not all such objects or advantages may be achieved in any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

In one aspect described herein, a hybrid integrated logistics ecosystem, the system comprises a cloud-based platform comprising: an integrated control tower configured to predict and detect transportation anomalies within a distribution network; a surface visibility system in communication with the platform and configured to relay real-time locational data of one or more vehicles in the distribution network; and a transportation management system in communication the integrated control tower, the surface visibility system, and the GPS tracking system, the transportation management system configured to: receive a transportation anomaly from the control tower; receive the real-time locational data of the one or more vehicles in the distribution network; and dynamically generate a revised one or more vehicle transportation routes based on the received driver information, transportation anomaly, and the real-time location data.

In some embodiments, the transportation management system comprises a freight auction system in communication with the transportation management system, and wherein the traffic management system is configured to dynamically generate the revised one or more vehicle transportation routes by automatically initiating an additional freight auction in the freight auction system.

In some embodiments, the system further comprises a fuel management system, the fuel management system configured to generate a fuel status for the one or more vehicles, and wherein the transportation management system is configured to: receive the fuel status for the one or more vehicles; and dynamically generate the revised one or more transportation routes further based on the received fuel status.

In some embodiments, the fuel management system generates an alert when a fuel status for a vehicle indicates that a fuel level in the vehicle is low.

In some embodiments, the system further comprises a GPS tracking system in communication with the surface visibility system and the platform, the GPS configured to generate and transmit geo-location information for the one or more vehicles.

In some embodiments, the system further comprises a workforce management system configured to dynamically assign one or more drivers to the transportation routes, and wherein the transportation management system is further configured to: receive the assigned one or more drivers from the workforce management system; and dynamically generate the revised one or more vehicle transportation routes further based on the assigned one or more drivers.

In some embodiments, the one or more drivers is an autonomous vehicle.

In some embodiments, the surface visibility system is configured to track asset movement at and between transportation cites.

In some embodiments, the integrated control tower is a software object configured to monitor the surface visibility system.

In some embodiments, the control tower is configured to identify the transportation anomaly by identifying a missing vehicle arrival or a late vehicle arrival based on the surface visibility system.

In some embodiments, the transportation management system is further configured to cause an autonomous vehicle to navigate to a facility associated with the transportation anomaly.

In some embodiments, the transportation management system is further configured to cause the workforce management system to identify an additional driver for the dynamically generated revised one or more transportation routes.

In some embodiments, the transportation management system plans and optimizes logistical operations for vehicle routes, processing and delivery facilities, and transportation vehicles.

In another aspect described herein, a method of transportation management, the method comprises detecting one or more transportation anomalies within a distribution network; generating real-time locational data of one or more vehicles in the distribution network; receiving, in one or more processors of a transportation management system, the transportation anomaly; receiving, in the one or more processors of the transportation management system, the real-time locational data of the one or more vehicles in the distribution network; and dynamically generating, in the one or more processors of the transportation management system, a revised one or more vehicle transportation routes based on the received driver information, transportation anomaly, and the real-time location data.

In some embodiments, dynamically generating the revised one or more vehicle transportation routes further comprises automatically initiating an additional freight auction in a freight auction system.

In some embodiments, the method further comprises generating a fuel status for one or more vehicles; and dynamically generating the revised one or more transportation routes further based on the received fuel status.

In some embodiments, at least one of the one or more drivers is an autonomous vehicle.

In some embodiments, the integrated control tower is a software object configured to monitor the surface visibility system.

In some embodiments, the method further comprise causing an autonomous vehicle to navigate to a facility associated with the transportation anomaly.

In some embodiments, the method further comprises receiving assigned one or more drivers from the workforce management system; and dynamically generating the revised one or more vehicle transportation routes further based on the received assigned one or more drivers.

In another aspect described herein, a transportation management system comprises a transportation management system comprising: a route optimization service; a manifest generation service; a solicitation service; and a freight billing service;

wherein the transportation management service in communication with the route optimization service, the manifest generation service, the solicitation service, and the freight billing service, and wherein the transportation management system is configured to revise one or more vehicle routes in based on information received from the route optimization service, the manifest generation service, the solicitation service, and the freight billing service.

In some embodiments, the system further comprises a user interface configured to allow users access to the transportation management system by a logistics gateway.

In some embodiments, transportation demand data is fed to the transportation management system by a predicted transportation demand service.

In some embodiments, the transportation management system communicates dispatch data through the integration layer to a transportation optimization planning system.

In some embodiments, the system further comprises a placard generation service configured to receive placard data from the transportation optimization system.

In some embodiments, the system further comprises a surface visibility system for tracking asset movement at and between facilities, wherein the placard data and a container bar code data is sent from the placard generation service to a surface visibility system.

DETAILED DESCRIPTION

The integrated logistics ecosystem is an enterprise solution to for distribution network systems, such as the United States Postal Service (USPS), for supporting processing facilities, headquarters contract, and transportation management organizations. The integrated logistics ecosystem manages complex networks by identification and use of underutilized transportation capacity, demand-based freight auction and contracting, service performance measurement using real-time asset location technologies, end-to-end visibility of transportation demand, and route planning and trip execution.

The integrated logistics ecosystem utilizes architecture for creating enterprise datasets and reusable services. In one embodiment, the integrated logistics ecosystem may be used across several architectural components such as transportation management, freight payment, integrated GPS, transportation visibility, logistics gateway, contract management system, freight auction, fuel management, surface visibility, workforce management, and integrated control tower components. The integrated logistics ecosystem may further incorporate and integrate any number of other systems. Transportation networks and logistical planning and organization of mail or item delivery, such as implemented by the USPS, includes a variety of systems, subsystems, and services that are functionally interconnected. These systems manage the collection, storage, and access of information including tracking and shipping individual mail pieces, vehicles and aircraft information used for transportation, GPS information, employee and workforce information, outsourced work and third-party information, contract information etc. These systems, subsystems, and services are traditionally segmented and do not dynamically communicate with one another. There is a need to integrate each system to dynamically communicate and form an integrated ecosystem. Integrating each service allows for the dynamic sharing of information as well and improves the communication of real time events that may impact operations of select systems, promotes efficiency, enables automation, and improves logistics and operation of a distribution network. This in turn reduces error and allows for the real-time management of each system.

As used herein, "driver" may refer to an individual that interacts with a vehicle. In some embodiments, "driver" may refer to an autonomous vehicle. As described herein, FIGS. 2, 3, 4, 7, 12, 13, 14, and 15 include numerical indicators to depict an order of operations of a given process flow. One of skill in the art will understand that the process flows and methods described herein are not limited to the order of these numbers.

Figure 1A:
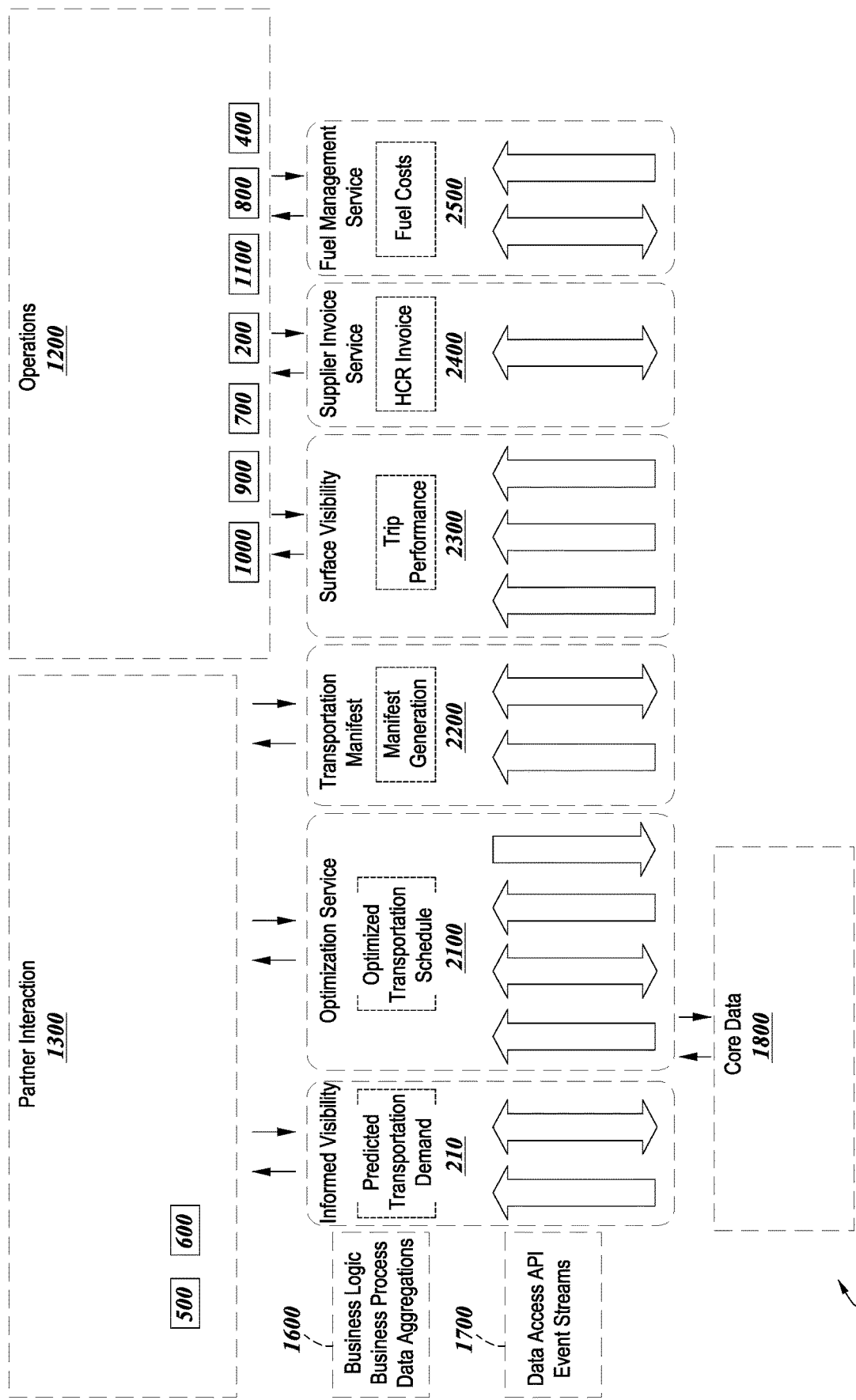
FIG. 1A is a summary diagram of the integrated logistics ecosystem and details the components that make up its architecture.
Figure 1B:
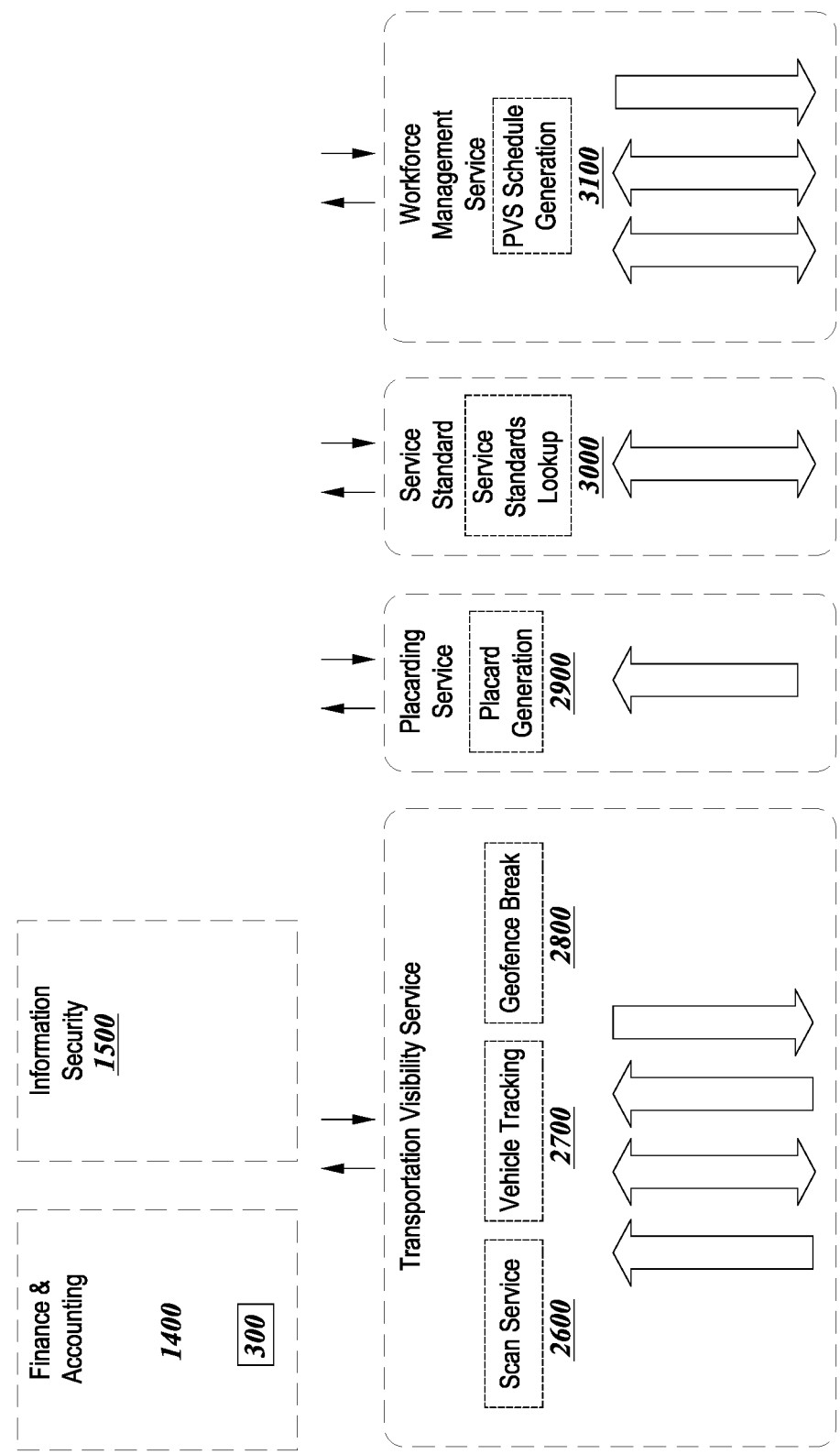
FIG. 1B is a summary diagram of the integrated logistics ecosystem and details the components that make up its architecture.

FIGS. 1A-1B depicts a summary diagram of the integrated logistics ecosystem 100 or ILE and details the components that make up its architecture. The integrated logistics ecosystem 100 provides an inventory of enterprise and tenant data objects, access layers, and services. The services provide capabilities across the categories or tenants for operations 1200, partner interaction 1300, finance and accounting 1400, and information security 1500 and enables transportation logistics supported by external service providers.

The operations tenant 1200 generally includes processes and systems for transportation planning, transportation optimization, transportation scheduling, and transportation execution. The partner interaction tenant 1300 includes processes and systems for transportation supplier services procurement and for transportation services management and coordination. The accounting tenant 1400 includes processes and systems for compensation of suppliers for transportations services. The information security tenant 1500 includes process and systems for information security and account management. As used herein, a tenant may include one or more components, e.g. systems, subsystems, combination of systems/subsystems, or workflow interaction between systems/subsystem. A tenant can be a high-level system or subsystem of an ecosystem, and can include one or more processors, servers, databased, memories, etc. which are directed to controlling a function or group of functions within a distribution network.

As used herein, a component can be one or more processors, servers, computers, databases, communication devices, which manage, direct, operate, or otherwise relate to a specific task or operation within an ecosystem or distribution network. A component can be embodied in hardware specifically dedicated or designed for an operation, or can be embodied in one or more software programs, objects, modules, or the like. In some embodiments, components can be subsystems or portions of a tenant.

The operations tenant 1200 is the primary tenant for transportation logistics capabilities and includes the following components: a transportation management component 200 which optimizes transportation through demand based dynamic routes. The transportation management component can determine how many and which types of vehicles or other resources are available for transporting items, such as parcels, mailpieces, etc., within the distribution network. The transportation management component 200 can also store fixed, static routes, such as daily or other frequency routes which include the same or similar stops each day, and dynamic routes to be travelled, for example, between facilities. Based on available resources, the transportation management component 200 can track and control movement of vehicles within the distribution network. The transportation management component 200 optimizes morning and afternoon transportations, routes, vehicles, schedules, etc., between processing and distribution centers (P&DCs) and delivery units (DUs) using demand based dynamic routes. In some embodiments, the transportation management component 200 dynamically optimizes network distribution centers (NDC), surface transfer centers (STC), air, and other transportation networks. In certain embodiments, the transportation management component 200 automates preparation of demand data needed for accurate forecast of transportation capacity and may generate weekly dynamic routes.

The system 100 includes an integrated GPS component 400 which integrates GPS into real-time transportation monitoring. The GPS component 400 can receive GPS or geo-location information from the vehicles, mobile computing devices, etc. on resources within the distribution network. The integrated GPS component 400 integrates GPS into transportation monitoring to provide real time estimated time of arrival and enable performance-based highway contract route (HCR) contracts.

The system 100 includes a freight auction component 700 which enables the digital solicitation, review, and implementation or transportation demand from suppliers. The freight auction component 700 can have information regarding freight carriers who have successfully bid on an opportunity to carry freight items within the distribution network. The freight auction component 700 can generate auction information, including item types, pickup and destination points, auction values, and can facilitate the presentation of the auction to one or more bidding systems. When auctions have been won or accepted, the freight auction component 700 can update the transportation management component 200 with additional delivery resource information. The freight payment component 300 automates supplier payment for dynamic routes, extra trips, cancellations, and other payment adjustments. The freight auction component 700 enables digital solicitation, review, selection, and implementation of ad hoc transportation demand from existing HCR suppliers.

The system 100 includes fuel management component 800 which automates calculation of fuel costs to include day-of and location specific rates, determines whether delivery resources can complete routes as assigned or if deviations are necessary for refueling. In some embodiments, the fuel management component 800 can track the charge or battery status of Automated guidance vehicles within a facility, electric vehicles, or other electric or battery powered resources, and can schedule recharging, modify routes, and the like based on the charge data. The fuel management component 800 automates calculation and compensation of fuel costs based on day-of and location-based pricing.

The system 100 includes a surface visibility component 900 which tracks the location of each surface transportation resource in the distribution network, including the location of each vehicle, truck, carrier, etc., within the network, and can automate transportation updates with GPS data and enables real time asset tracking at facility locations. The surface visibility component (SV) 900 automates actual transportation updates with GPS data and create new visibility points at non-SV locations. In certain embodiments, the surface visibility component 900 enables real-time asset tracking at yards of NDCs, P&DCs, STCs, and other facilities.

The system 100 comprises a workforce management component 1000 which optimizes facility operations and transportation through forecasted demand based dynamic routing using information received from the informed visibility service 210, the GPS component 400, the surface visibility component 900, and other components. The workforce management component 1000 optimizes postal vehicle service (PVS) transportation through forecasted demand-based dynamic routing and schedule PVS drivers using configurable business rules.

The system 100 comprises an integrated control tower component 1100 which predicts and recognized transportation anomalies and mitigates the impact to the transportation network through automated recommendations. The integrated control tower component 1100 can be software object or module running and monitoring the transportation systems of the distribution network, including monitoring the operation of the components described herein to automatically change routes, update pickup and/or dropoff times and locations, summon additional vehicles, and the like to prevent or minimize delays and congestion within the distribution network. The integrated control tower component 1100 predicts and acts in real-time on exceptions and transportation anomalies impacted by factors such as weather and traffic. In certain embodiments, it may further minimize the overall impact of such factors to the network with automated recommendations, such as, mode change, expedition, or cancellation.

The partner interaction tenant 1300 is the primary tenant for the supplier coordination capabilities and includes a contract management system component 600 which is an integrated platform for transportation solicitation, bid, and contract management. The partner interaction tenant 1300 can include a user interface connected to one or more APIs 1700 to enable a distribution network partner such as a shipper, a warehouse, a contract driver, or other similar entity to access the core data 1800 through one or more of the components. In some embodiments, the partner interaction tenant 1300 includes business rules to enable partners to access, evaluate, and download information for items within the distribution network that are related to or associated with the specific partner. The contract management system component 600 provides an integrated platform for all transportation solicitation, bid, and contract management.

The partner interaction tenant 1300 includes a logistics gateway component 500 which allows for supplier access to transportation analytics, bid management, and related aspects of freight auction and other components according to business rules. The logistics gateway component 500 enables self-service supplier access to transportation analytics, bid management and freight auction capabilities through a user interface accessible by suppliers registered with a distribution network. The logistics gateway component 500 can determine partner data access based on the identity of the partner. For example, a contract driver can access a freight auction, and a shipper may access information regarding network traffic, drop locations, transportation availability, delivery dates, and the like.

The finance and accounting tenant 1400 is the primary tenant for supplier payment capabilities and includes a freight payment component 300 which automates supplier payment for dynamic routes and other payment adjustments. The information security tenant 1500 provides for capabilities of information security. While each of these tenants may serve as the primary tenant for certain capabilities and systems, many of these components overlap and also perform duties found within other tenants. Further systems and subsystems within each component may be found in other components.

Several microservices and event streams may interact with the above mentioned components. In some embodiments, such microservices include a solicitation service to allow supply management to solicit, evaluate, and award HCR contracts. In some embodiments, a contract creation service may automatically create a contract upon the award of a bid. In some embodiments, a contract administrative service may be used for contract life cycle management, renewal, and termination. In some embodiments, a cost adjustment service may allow cost adjustments such as fuel surcharge rate per mile, department of labor (DOL) wage adjustments and regulatory updates. In some embodiments, a supplier profile event stream may be used to allow HCR suppliers real-time visibility, access to reporting tools, updated manifests, and payment status. In some embodiments, a logistics gateway microservice may be used to allow HCR suppliers real-time visibility, access to reporting tools, updated manifests, and payment status. In some embodiments, a payment account event stream can be used to generate supplier account ID's for payment. In some embodiments, a payment, and invoices microservice may be used to calculate payment to the suppliers. In some embodiments, a trip manifest event stream may be used to allow supplier self-service to trip manifests. In some embodiments, a transportation microservice or event stream may be used to allow suppliers self-service access to geospatial data of supplier vehicles. In some embodiments, a freight payment microservice may be used to automate suppliers payment for dynamic routes, extra trips, cancellations and other payment adjustments. In some embodiments, an invoice microservice may be used to generate invoices to pay the suppliers.

Several microservices and event streams may interact with the above mentioned components, and may be included in one or more tenants described herein. In some embodiments, a transportation management event stream may optimize transportations through demand based dynamic routes. In some embodiments, a dispatch event steam creates dispatch for network trips. In some embodiments, the transportation management event stream can instruct vehicles to operate via instructions to a carrier or driver. In some embodiments, the transportation management event stream can direct or cause autonomous operation of autonomous vehicles within a facility and/or between facilities of a distribution network.

In some embodiments, a placarding microservice automatically generates placards for enabling plant sites to print the placard from the transportation management system dashboard. In some embodiments, a routing event stream generates transportation trip schedules to meet pre-defined service standards. In some embodiments, a mail package and visibility event stream provides visibility of mail and packages. In some embodiments, a surface and yard visibility event stream automates actual transportation updates with global positioning system (GPS) data and creates new visibility points to enable real-time asset tracking at yards. In some embodiments, a service management microservices provides additional operational services. In some embodiments, a facility event stream provides facility information. In some embodiments, a fleet event streams provide vehicle information. In some embodiments, an address event stream provides address information. In some embodiments, a mail handling equipment event steam identifies types of mail processing equipment (MPE) to sort mail and packages into individual mail transportation equipment (MTE) based on a range of zip codes. In some embodiments, a capacity planning microservice provides visibility across locations so that supply management can place accurate orders by responding by demand. In some embodiments, a network planning microservice allows network planning. In some embodiments, a scheduling microservice allows planning and creation of dynamic route schedules.

In some embodiments, a supplier payment event stream provides payment status to suppliers. In some embodiments, the supplier payment event stream can be part of the accounting tenant 1400, or can occur within systems or components of the accounting tenant 1400.

In some embodiments, a single sign on microservice of the information and security tenant 1500 allows for single sign-on for suppliers. In some embodiments, an authorization microservice authorizes users of supplier services. In some embodiments, a security mapper microservice maps supplier-to-trailer-to-GPS from SEAM architecture and may also receive APEX supplier ID.

Interacting with these components and microservices are data aggregation service 1600 services and associated application programming interfaces or API's 1700. The API 1700 allows communication between the data aggregation service 1600 and core data 1800 of the integrated logistics ecosystem 100.

A data aggregation service 1600 can gather data from various sources within the core data 1800 or other systems, and governed by specific business rules, can prepare output data, create a data repository for relevant data, and can control autonomous operations of distribution network equipment, including vehicles or processing equipment. The data aggregation services 1600 may operate on one or more of the tenants or components described herein.

An informed visibility service 210 is an example of a data aggregation service 1600 and is a service that may perform transportation demand predictions, resource demand predictions, mailpiece volume predictions for one or more facilities. The informed visibility service 210 receives core data 1800, including mail piece scans or other events, mailpiece volumes, and dynamically interacts with facilities information data. The optimized transportation service 2100 is another data aggregation service 1600 and may interact with the core data 1800 by receiving HCR trailer and container ID's and predicted transportation demand and response to demand, including a quantity and/or type of delivery vehicles or similar resources. In some embodiments, the optimized transportation service 2100 dynamically interacts with HCR data and determines transportation schedules. The manifest generation service 2200 is another data aggregation service 1600 and may generate optimized transportation manifest and trip schedules, receive transportation schedules from the core data 1800, and dynamically interact with HCR suppliers.

Trip performance 2300 is a data aggregation service 1600 of surface visibility component 900 which may perform trip to performance calculations and receive core data 1800 such as placards, surface scans, and transportation schedules. HCR invoice service 2400 is a data aggregation service 1600 which may generate HCR supplier invoices and dynamically interact with core data 1800 such as HCR contract data. Fuels costs fuel rate service 2500 is a data aggregation service 1600 which may calculate daily fuel surcharge rates based on day of and location-based pricing. The fuels costs fuel rate service 2500 may receive core data 1800 such as transportation manifests and dynamically interact with fuel rate data. Scan service 2600 is a data aggregation service 1600 for surface visibility (SV) scans. Vehicle tracking service 2700 is a data aggregation service 1600 which may track vehicles. Geofence break service 2800 is a data aggregation service 1600 which may generate a geofence break with timestamps for each trip. The scan service 2600, vehicle tracking service 2700, and the geofence break service 2800 may interact with core data 1800 such as receiving GPS device data and HCR trailer/container ID's. A geofence break may be an event where a vehicle or other delivery resource exits or enters a geofence surrounding a facility, a delivery point, or other location having a geo-fence associated therewith. In some embodiments, these services also dynamically interact with facilities data and send integrated GPS data to the core data 1800. Placard generation service 2900 is a data aggregation service 1600 that may generate placards and receive transportation scheduling information from the core data 1800. Standards lookup service 3000 is a data aggregation service 1600 which can be used to lookup service stands and dynamically interact with the core data 1800. The PVS schedule generation service 3100 is a data aggregation service 1600 which can generate PVS schedules and dynamically interact with core data 1800 such as PVS driver data and PVS routes data while adding PVS schedule data.

The core data 1800 of the integrated logistics ecosystem 100 may include, but is not limited to, the following: user services authorization which is used for requesting and approving access to supplier services; scan data which includes scans of containers and trailers; vehicle data which includes an inventory of vehicles; wage rate from the department of labor, daily calculated fuel rates; employee profile for PVS drivers; GPS breadcrumb data including vehicle, trip, and facility information; highway contract route static trips; box route data such as deliver of the ail to actual delivery addresses; PVS routes to distribute mail and collect outgoing mail; transportation manifests and trip schedules; other manifests such as transportation schedules; supplier invoices, PVS trip schedules, mail piece data; accounts payable including payment information; placard information including route, trip, mail class, mail type, and unique barcodes; mail transportation equipment data; service standard information such as standards for all origin and destination ZIP and product categories; finance cost center data such as finance number and control muster profiles; facility information; solicitation package and procurement information; bid information; contract information; and supplier profile information. Other information and data is listed throughout the application that also makes up core data 1800 of the integrated logistics ecosystem 100.

Figure 2:
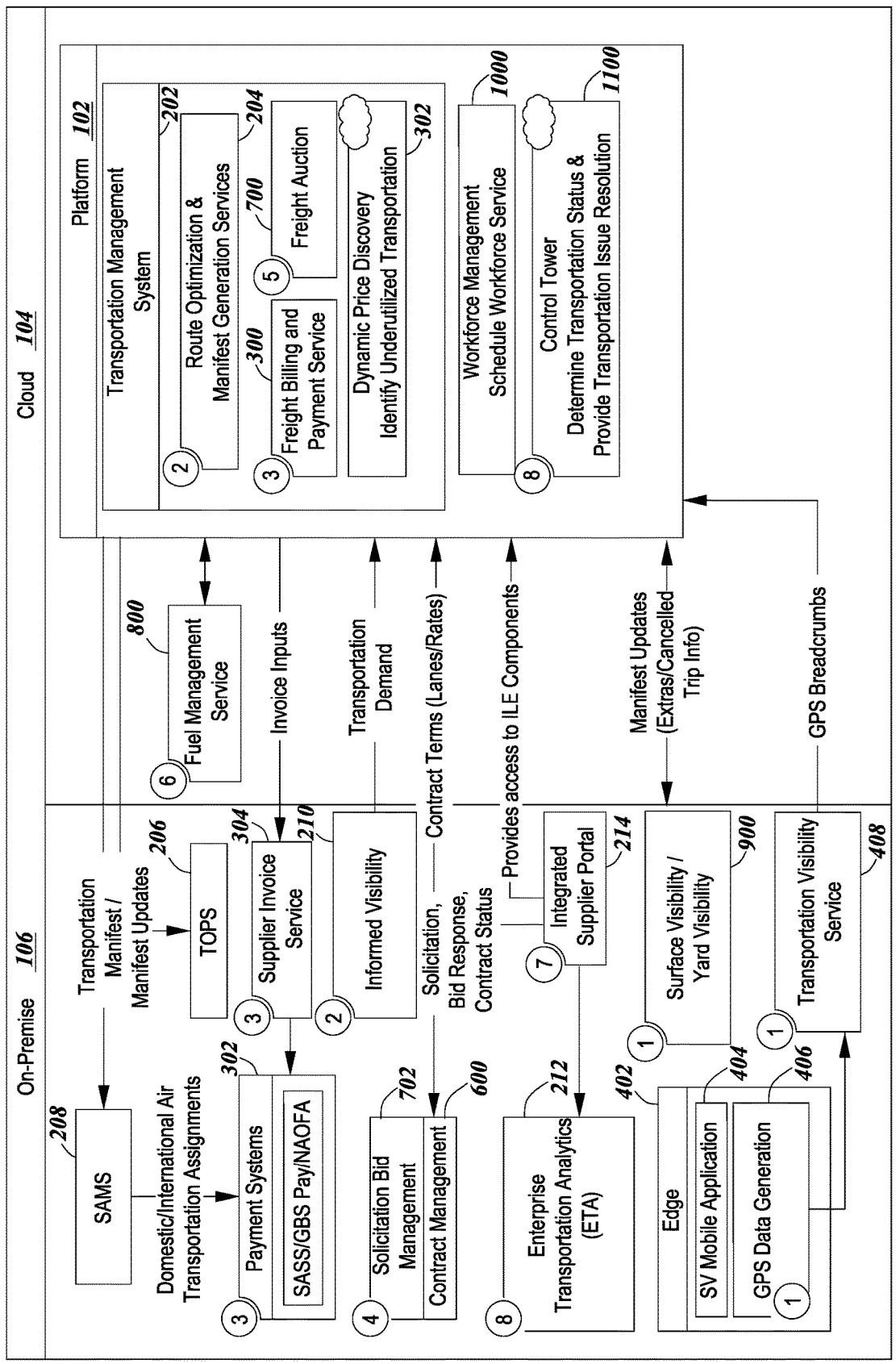
FIG. 2 is a schematic overview of the interactions between on-premise and cloud based systems of the integrated logistics ecosystem.

FIG. 2 is a schematic overview of the interactions between on-premise and cloud based systems according to some embodiments of the integrated logistics ecosystem 100. The ILE system can be embodied in local, remote, and cloud-based computing devices in order to improve communication between tenants, components, and services. The systems described herein can be those described with regard to FIG. 1A and 1B, or can be similar to those described elsewhere herein. As shown, part of the integrated logistics ecosystem 100 is located on cloud 104 and part is located on-premise 106. Within the cloud 104 there is a platform 102 which encompasses a transportation management system 202, the workforce management component 1000, and the control tower component 1100. The fuel management component 800 is also found in the cloud and interacts directly with the platform 102. The transportation management system 202 includes the manifest generation service 2200 along with the freight payment component 800, the freight auction component 700, and a payment system 302 services.

The on-premise portion of the integrated logistics ecosystem 100 includes an edge 402 service which communicates with a transportation visibility service 408 which in turn communicates with the platform 102 via GPS breadcrumbs. Edge 402 service includes an SV mobile application 404 and GPS data generation 406 which may include services such as Orbcomm, CalAmp, MVTA of PVS. The edge 402 communicates with the transportation visibility service 408 which takes into account data from the integrated GPS component 400, and sends GPS breadcrumb data to the platform 102.

A payment system 302 interacts with the supplier invoice service 304 which receives invoice inputs from the platform 102. The payment system 302 may also communicate with a surface air management systems or SAMS 208. SAMS 208 may receive transportation manifest and manifest updates from the platform 102. These updates may additionally be received by a transportation optimization planning system or TOPS 206. The Informed visibility service 210 may send transportation demands to the platform 102. A solicitation bid management service 702 and the contract management system component 600 receive solicitations, bid responses, and contract status information from the platform 102, and sends contract terms such as lane rates to the platform 102. Some of the information communicated to and from solicitation bid management service 702 and contract management system component 600 from the platform 102 is also sent to the integrated supplier portal 214 which dynamically interacts with this information. The integrated supplier portal 214 communicates with the enterprise transportation analytics 212 (ETA) which in turn visualizes and predicts transportation. The integrated supplier portal 214 also provides access to the ILE components of the platform 102.

In some embodiments, the informed visibility service 210 feeds predicted demand forecasts into the transportation management system 202. The solicitation bid management service 702 and contract management system component 600 may solicit, evaluate, and awards HCR contracts through the transportation management system 202. In some embodiments, the transportation management system 202 schedules dynamic transportation. The workforce management component 1000 may dynamically assign PVS drivers or autonomous vehicles to trips. The freight auction component 700 may allow suppliers to respond to trip requests. GPS events captured during surface trips may be combined from multiple data sources in the transportation visibility service 408. Dock clerks may scan containers and trailers in order to provide yard and surface visibility for surface visibility component 900. The freight payment component 800 may automatically pay suppliers for HCR routes through the freight payment component 800 service of the transportation management system 202. The integrated logistics ecosystem 100 may manage the use of third-party visibility platforms in conjunction with transportation management system 202 and transportation visibility service 408 to provide visibility into transportation on-time performance as well as anomalies, and ability for corrective actions. The Fuel management component 800 service may ensure HCR suppliers are compensated for fuel surcharge based on the fuel rate index. HCR suppliers may log into the logistics gateway component 500 to receive real-time visibility, access to reporting tools, updated manifests, and payment status.

Although not depicted, an integration layer facilitates communication between the platform 102 and some of the on premise 106 aspects of the ecosystem.

Figure 3:
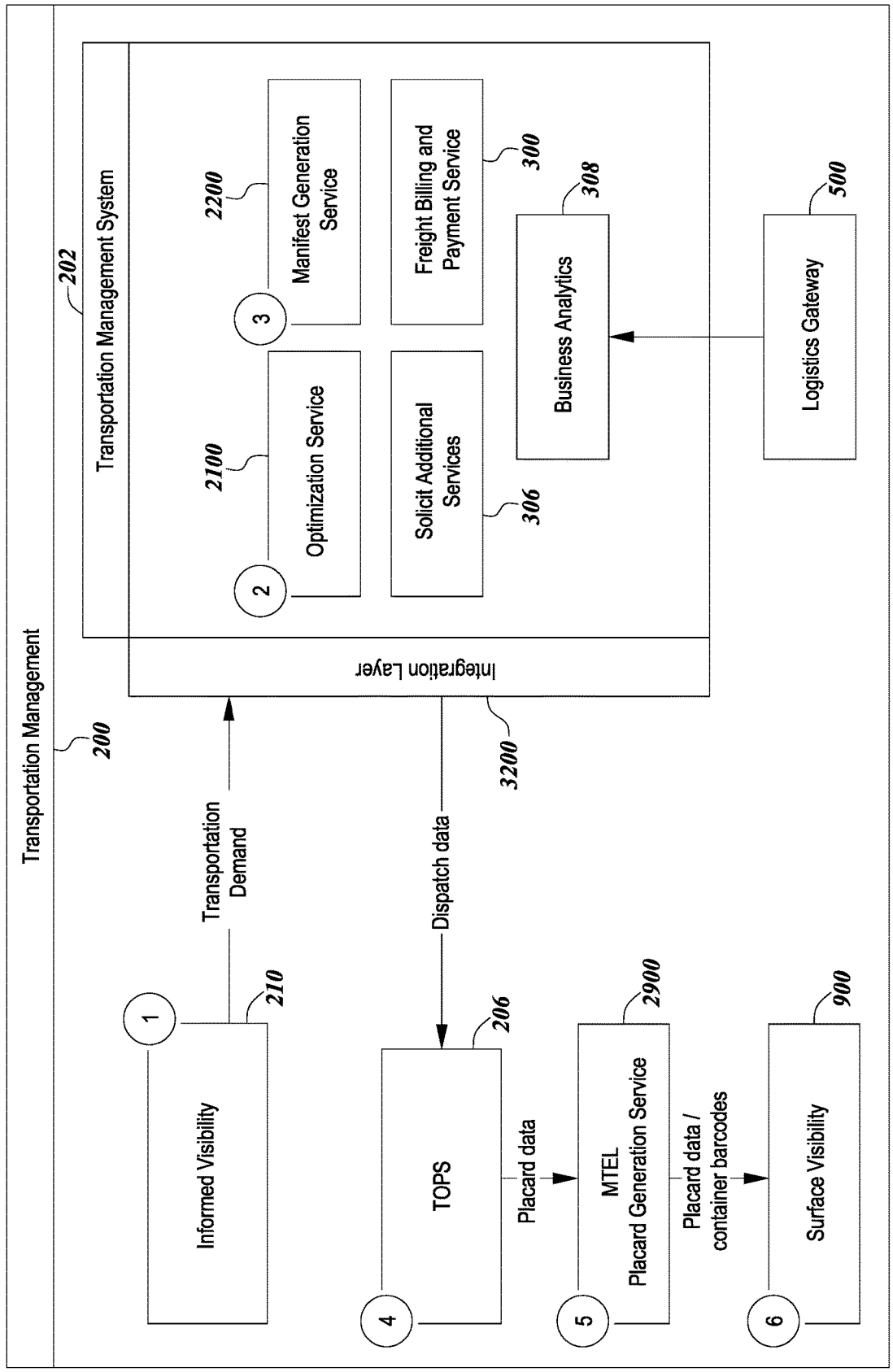
FIG. 3 is a process flow diagram according to an embodiment of a transportation management component of an integrated logistics ecosystem (ILE).

FIG. 3 is a process flow diagram according to an embodiment of the transportation management component 200 of the integrated logistics ecosystem 100. The transportation management component 200 includes the centralization of planning and optimization for logistics operations across all USPS transportation networks, including, routes, processing and delivery facilities, and transportation vehicles.

The transportation management system 202 can use all the information gathered from disparate or separate systems or components to prepare a coherent and dynamic routing for the distribution network for a given time period, or on-demand in real-time or near real-time. In some embodiments, the transportation management system 202 can automatically change a route, a vehicle, add a route, request an additional freight auction, request a new route, navigate an autonomous vehicle, in order to ensure efficient operation or to minimize delays, or to correct for a bottleneck or other issue. For example, where the transportation management system has a set of routes for delivery or transportation of items, and a new manifest is received, a low fuel situation develops, the integrated control tower 1100 detects a traffic jam or potential traffic jam, an item or truck is missing an arrival or departure scan, or other impact is detected in the transportation system, the transportation management system can automatically take corrective action.

Additionally, while the transportation management component 200 may interact with a variety of different components and services of the integrated logistics ecosystem 100, FIG. 3 depicts core aspects of the transportation management component 200 according to some embodiments. Here, the optimized transportation service 2100, manifest generation service 2200, solicit additional services 306, freight payment component 800, and the business analytics module 308 may all be part of the transportation management system 202. The transportation management system 202 may interacts with other systems and services, such as the informed visibility service 210, TOPS 206, placard generation service 2900, and surface visibility component 900 through an integration layer 3200. The logistics gateway component 500 may interacts with the transportation management system 202 directly.

An example process flow of these systems may begin with the informed visibility service 210 which may generate container demand, mail class, and mail types, and send this data to the transportation management system 202. The informed visibility service 210 is responsible for the predicted transportation demand. The transportation management system 202 may then produce optimized HCR transportation based on predefined constraints and site-specific considerations. The transportation management system 202 may also use an optimized manifest generation service 2200 for provisioning to the downstream systems and HCR suppliers. The transportation management system 202 may then send dispatch data to TOPS 206 which may automatically generate dispatches based on the data provided by the transportation management system 202. The placard generation service 2900 may then receive all the data needed for generating placards, such as but not limited to, zip ranges, mail class, mail type, and via points. Placards can be instructions for delivering a container, such as a pallet, bin, shelf, and the like within a facility or between facilities. The placard can include printed information indicating the intended destination and route information for the container and a computer readable code encoding or referring to the intended destination and route information.

Surface visibility component 900 may then receive the route-trip and placard information from the upstream systems. In some embodiments, the transportation management system can change or update placard information depending on predicted incoming volume, transportation issues, availability or lack of availability of vehicles, etc. for example, if the transportation management system 202 determines that a vehicle intended to pick up items at a facility is delayed, has less capacity than originally planned, an unplanned pickup is made, etc., the transportation management system may change the placard information and request additional or alternative vehicles to take the items along alternate routes according to the placard instructions.

The optimized transportation service 2100, freight payment component 800, and solicit additional services 306 may also contribute to the dispatch data. HCR suppliers may utilize a logistics gateway component 500 to gain access to the transportation management system 202. Further, the business analytics module 308 of the transportation management system 202 may provide business analytics and trip manifests to the HCR suppliers. For example, if a new route is needed, the transportation management system can instruct other components to create a new contract route, modify a contract, initiate a freight auction, or the like to accommodate the movement of items along the new route.

The transportation management system 202 may be used for some or all HCR trip scheduling and enable PVS schedule optimization when used with the workforce management component 1000. When a new trip or route is created, the workforce management component 1000 can automatically request additional resources to operate equipment, such as truck drivers, forklift drivers, equipment operators, facility personnel, supervisors, and the like.

The informed visibility service 210 is a single corporate standard data source for mail tracking, service performance, and predictive analytics. In some embodiments, the informed visibility service 210 may provide access in near real-time to all data events for all mail pieces, trays and containers, and track these products through the entire induction, transport, and delivery lifecycle while simultaneously identifying and presenting actionable information for fully-informed decisions that benefit both internal and external customers. The informed visibility service 210 may contain historical records of each mail piece and package count information that can be used to generate demand planning inputs for the transportation management system 202. Informed visibility service 210 may be responsible for providing actual and forecasted mail volumes for dynamic transportation, including both long-haul and short-haul routes.

The informed visibility service 210 may provide the transportation management system 202 with various core data 1800. The main categories of data to be supplied include reference data and mail volume data. Reference data may include data involving the processing facility logistics group, processing facility plan ID's, destination delivery start time such as the earliest potential arrival time at destination facility, and destination delivery end time which is the latest potential arrival time at destination facility. Mail volume data may include origin pickup start time such as predicted time of container processing completion, origin pickup end time such as the latest potential departure time to arrive by destination delivery end time-based routing from origin to destination, ship from site NASS code, ship to final site NASS code, container type, predicted container quantity, mail class, mail shape (aka mail type), ZIP code ranges. The informed visibility service 210 may also take into consideration forecasting volume availability, forecasting model specifications, and data provisioning specifications. Forecasting volume availability may include, but is not limited to, facility network volume, morning outbound volume, morning express mail volume, afternoon inbound volume, mailer inbound volume. Forecasting model specifications may include a business logic definition, model accuracy assessment, or timeline for model availability. The data provisioning specifications may include a provisioning approach and data refresh frequency.

Within the placard generation service 2900, placards are generated for identifying and tracking the mail transportation equipment (MTE). The MTE can include movable containers or pallets, shelves, bins, rolling stock, etc. that can be used to store multiple items, trays, tubs, sacks, and the like. Each of the trays/tubs/sacks may contain the individual mail or package pieces. The process of putting these trays/tubs/sacks into a container is called nesting. Once nesting is complete, the MTE is taken to the dock-door for scanning and loading into a transportation vehicle. Automated tray label assignment systems (ATLAS) may be used for creating and printing item, tray, tub, and sack labels.

Integrated on demand placarding (IODP) may be used to automatically generate mail transportation equipment labeling (MTEL) equivalent placards for the automatic package processing system (APPS). The IODP may be used to generate placards via at least the following process under the direction and control of the transportation management component 200: containers are moved under an MPE chute; an IODP application is used to upload the appropriate sort program from APPS; the IOPD application ingest the sort program, as well as transportation data from TOPS; placards are automatically generated and printed for each container; placards are attached to containers using bin numbers; mail is sorted and placed into the appropriate bin, assign and close events are automatically generated; and new placards are generated on-demand for additional containers.

The TOPS 206 system is responsible for planning and scheduling the transportation of the integrated logistics ecosystem 100. TOPS 206 may create dispatches for network trips where the dispatches represent an association between a distribution table record and one or more transaction records. TOPS 206 may send these dispatches or other data to the following: MTEL which is responsible for generating placards; service delivery calculator (SDS) which handles express mail; transportation information management evaluation system (TIMES) which covers surface and dock operations; national traffic management system (NTMS); and SAMS for planned routes.

TOPS 206 may further receive data from the following: transportation contract support system (TCSS) which manages contracted trucks; vehicle inform trans analysis and logistics web (VITAL) which manages postal trucks, VITAL also communicates with TIMES; the national air and surface systems web (NASSWeb); the logistics contract management system (LCMS) which handles contracts with FedEx, UPS, and AMOT, LCMS also communicates with NASSWeb which in turn communicates with SAMS; the official airline guide (OAG) for passenger flights, where both the OAG and the NASSWeb received air carriers generated routing (CGR); mail processing operating plan system (MPOPS) for critical entry time (CET) and CT, MPOPS in turn communicates with the facility access and shipment tracking (FAST) which schedules mailers; facility; NDLL; and ATH. Further a distribution tables maintenance system (DTMS may communicate with a transaction concentrator (TC) which handles DTMS tables and communicates with scan where you band (SWYB) workstations on the floor and SAMS.

As described herein, USPS may utilize multiple processing facilities. These facilities include P&DC's, customer service facilities (CSF), NDC's, logistics and distribution centers (LDC), annexes, surface transfer centers (STC), air mail centers (AMC), remote encoding centers (REC), and international service centers (ISC).

SAMS may create the dispatch and routing (D&R) tags/placards for air transportation which are scanned by terminal handler scanning system (THSS). THSS may capture the receipt, movement, and dispatch of handling units as they are transferred between USPS and contracted air carriers in containers thus increasing visibility.

Surface visibility component 900 may receive scheduled trips from TOPS 206 and container placards from the placard generation service 2900. Mail handlers and dock clerks may utilize the SV mobile application 404 (not shown in FIG. 3) on mobile delivery devices (MDD) to perform a series of scans on container and trailer barcodes for visibility as they prepare mail MTE for outbound transportation and unload MTE from inbound transportation. The surface visibility component 900 system and the respective scans are used to record activities such as MTEL placard assignment to mail transportation equipment, close of container following mail preparation, load of container onto trailer, departure of trailer, arrival of trailer, and unload of container from trailer. These activities may be captured via scans by the user and required for each container and/or trip. Users may also modify, create, and cancel trips within the surface visibility component 900. Trips may be added whenever existing schedules are insufficient to transport the necessary mail volume. Users may be required to identify and record the reason for extra trips within the surface visibility component 900. In some embodiments, the reasons can be automatically generated by the transportation management system 202 in response to a change, issue, or other variation.

Further, core capabilities of the transportation management component 200 may include site onboarding for defining route requirements and structure to enable ongoing dynamic planning such as demand planning which entails forecasting transportation capacity needs based on anticipated volume, route planning for generating transportation trip schedules to meet pre-defined service standards, an/or route execution for dispatching container and trailers at departure and accepting at arrival.

As per the terminology of the integrated logistics ecosystem 100, a "route" may be defined as an origin and destination pair without schedule information. This may be static or dynamic. Further, a "contract" may be defined as a collection of routes. A "trip" may be a route with a date and/or time of execution. A "schedule" may include a collection of trips.

Figure 4:
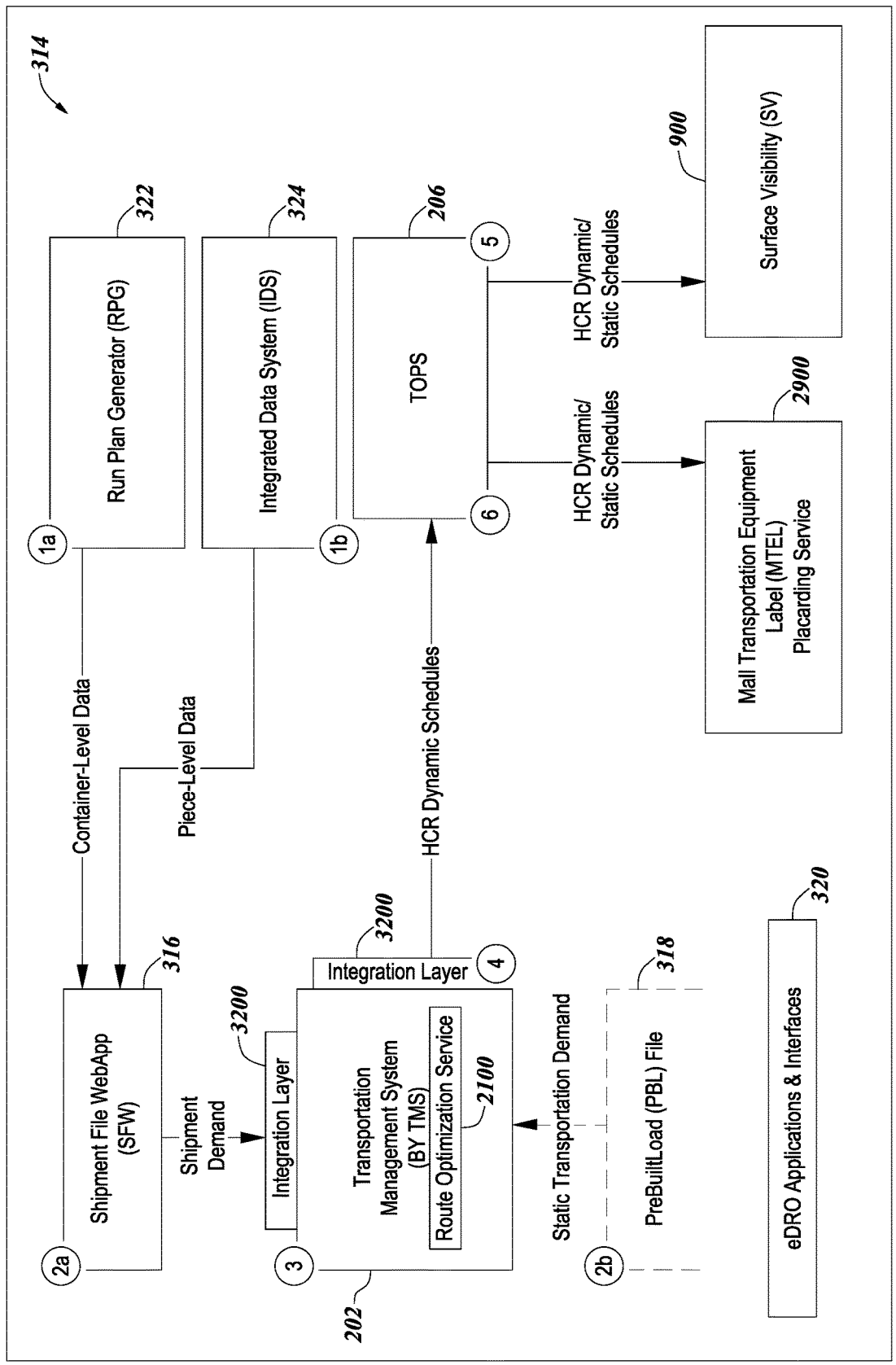
FIG. 4 shows a process overview diagram of dynamic route optimization of surface transportation within an ILE.

FIG. 4 shows a process overview diagram of dynamic route optimization of surface transportation within the ILE according to some embodiments. Dynamic route optimization (DRO) 314, integrates with mail volume input systems and the route scheduling systems to plan and create dynamic transportation and delivery routes. DRO 314 generates transportation schedules for P&DC's to maximize vehicle utilization based on forecasted volume demands.

In some embodiments, a run plan generator (RPG), RPG 322, is provisioned in a shipment file web application (SFW), SFW 316. An integrated data system (IDS), IDS 324, provides scan data to SFW 316. EDRO sites 320 serve as an interface to input transportation and demand data. At the eDRO site 320, shipment demand is generated based on RPG 322 and IDS 324 inputs, such as container-level data and the SFW 316 sends the demand data to the transportation management system 202 via the integration layer 3200. The RPG 322 sends the SFW 316 container-level data while the IDS 324 sends the SFW 316 piece-level data. Further, a static transportation demand may be generated using a pre-build load (PBL) file, PBL 318, that processes PBL data. The PBL 318 provides the static transportation demand to the transportation management system 202. At the eDRO site 320 this data is input into the transportation management system 202. Transportation managers may optimize transportation in the transportation management system 202 based on morning and afternoon demand transportation schedules and enter the demand into the transportation management system 202 by selecting shipment legs for optimization and/or running the optimization using configuration files specific to the site and transportation type. The integration layer 3200 may convert the extracted optimized transportation management system 202 trips into USPS leg format and create a daily file for TOPS 206. TOPS 206 may generate the final HCR schedule daily which contains HCR static and dynamic trips/schedules, and provide the information to surface visibility component 900. TOPS 206 may also provide the final HCR static dispatches and dynamic trips to the placard generation service 2900 system for creation of transportation placards for container visibility.

The optimized transportation service 2100 of the transportation management system 202 may require information for the available fleet and the anticipated volume to complete the route and trip definition process. To support this, the transportation management system 202 may receive two weekly input files for each dynamic site: the shipment file from SFW 316 and the PBL file from PBL 318 containing available transportation options and static demand assumptions. Thus, demand planning may be performed using inputs and systems of the PBL 318, RPG 322, IDS 324, and SFW 316.

In some embodiments, the PBL 318 may be used as an input for trips where capacity demand cannot be forecasted and must be statically maintained. This may include transportation routes such as the morning express, delivery units sent to P&DC, or USPS pick-up from mailer facility to P&DC. The PBL 318 file does not change week-to-week unless ad-hoc transportation is requested by local transportation managers/specialists (e.g., mailer-requested an additional trip). This file of static trips may be created weekly by a contractor team and provided to the transportation managers at the local site. The file may be reviewed by the local specialists and any updates are request from the PBL 318. The PBL 318 file may be uploaded using the transportation management system 202 user interface upon confirmation of the required schedule.

In some embodiments, the SFW 316 may be used to input the dynamic demand files. In some embodiments, one SFW 316 file may be provided per site per week. The SFW 316 system may receive inputs from RPG 322 and IDS 324 systems. The RPG 322 may contain the run plans for a site (plan level) and the IDS 324 may contain relative mail piece distribution on the ZIPS level. SFW 316 may combine this information and output a file in .csv format. The SFW 316 file may then be run through a consolidation tool and renamed and uploaded to the SFW 316 server. The integration layer 3200 may then transfer the file from the SFW 316 server to EDRO sites 320 sever and then import the file into transportation management system 202.

In some embodiments, the RPG 322 may be used by processing plants to schedule mail sorting operations among their available mail processing machines. The RPG 322 data may be downloaded in CSV format from web end-of-run (WEB-EOR). The following data fields may be used in the RPG CSV file: sort program names, operation numbers (OPN's), machine types, sort program start/end times, and sort program projected volume. This data may be uploaded to SFW 316 in conjunction with mail processing actuals data from IDS 324 to generate a shipment file. The resulting shipment file may be run through a tool that performs consolidation logic to associate mail pieces with containers.

In some embodiments, the SFW 316 is a web application and can utilizes the RPG 322 data (i.e., forecast data) from web end-of-run (WEB-EOR) and the mail processing actuals from IDS 324 to forecast container volumes by ZIP groups. The SFW 316 can considers certain constraints and parameters such as Integrated Operating Plan (TOP) times that are agreed upon between P&DCs and delivery units. A shipment file may be generated by SFW 316 and sent to transportation management system 202 where transportation managers perform transportation optimization.

Once the local transportation specialist completes the demand planning operation and data upload into the transportation management system 202, a user interface may be utilized to initiate the optimization, view the optimized results, accept the results, and send them for downstream processing by setting the trips to "set to planned." The transportation management system 202 may then create a load tender accepted (LTA) file. LTA's are loaded to the EDRO sites 320 server in real time, where they are encrypted. The encrypted LTA may be loaded to the integration layer 3200 database. If a site needs to cancel a trip, they can do that within transportation management system 202, which can creates a load tender rejected (LTR) file. This file may be encrypted and loaded to the integration layer 3200 database, and the associated trip may be deactivated.

According to some embodiments, once per day all active trips for the current day plus the next 13 days are aggregated into a flat file and loaded to TOPS 206. TOPS 206 ingests this file and verifies against surface transportation constraints or rules such as whether sites are active, the operating hours, no loopy trips, no two trips with same trip number and route, etc. TOPS 206 provides the dispatches to placard generation service 2900 for transportation equipment placard generation and surface visibility component 900 for tracking of transportation equipment and trailer. In addition, TOPS 206 may send data to another IODP.

Placard generation service 2900 may trip manifest information and dispatches from TOPS 206 and use this information to create container placards for use in facility processing. The placards may contain important trip information including route, trip, via points, mail class, mail type and a unique barcode for each printed placard. Once generated, the transportation placards may be printed as labels by operations employees and affixed to containers.

In some embodiments, the transportation demand data and transportation constraints are fed into the transportation management system 202. Based on the input data, transportation management system 202 may generate dynamic routes which are provided downstream to placard generation service 2900 via TOPS 206. TOPS 206 may serve as a proxy for dynamically generated routes for the local associate office/delivery unit (AO/DU) routes. In addition to the dynamic routes, Placard generation service 2900 also ingests customization records from a separate data feed which allows automatic placard generation. Once the placards have been created and applied to the completed containers, the containers could proceed to scanning and loading.

The cadence at which the local transportation is conducted can be optimized by taking into account volume fluctuations with regards to demand data and system parameters. Volume fluctuations may be analyzed over a long period of time such as several years which can be used to determine seasonal variations as well as trends over time based on mail class. Such fluctuations may also be monitored over short periods of time such as days, weeks, and months.

Network transportation can be optimized by utilizing multi-modal transportation modeling of the transportation management system 202. This modeling allows for surface and air transportation to be processed concurrently as they are both required to comply with the service standards. Moreover, air transportation trips may be tied to at least two surface trips. For example, from the P&DC of the origin air stop and from the destination air stop to the destination P&DC. Thus, surface schedules can be optimized while air transportation may be treated as static. The modeling allows for transportation to be optimized by analyzing datasets. Such data sets could include service standards which define the maximum duration between leaving the origin and arriving to the destination by mail type. Other data could include, facilities data including location and capacity constraints, critical entry times (CET), data collection technician (DCT), and throughput etc. Still other data could include demand by using a volume matrix that defines origin to destination pairs and volumes by mail class. Costs which are defined for each potential leg of the transportation, either air, land, or sea may be another data set. Still other data and varying constraints may be taken into account such as operating plans, requited times for mail processing, cross-dock transportation, etc.

Transportation management component 200 helps to optimize aspects of the integrated logistics ecosystem 100 and DRO 314 process. For instance, it may reduce and/or eliminate manual tasks related to providing demand data from RPG and IDS via SFW for local morning transportation. Further, it may provide a demand planning solution for afternoon transportation. The transportation management system 202 may reduce and/or eliminate manual input such as the need for transportation managers to manually load static schedules and manually initiate the route optimization process. The transportation management system 202 may also eliminate the need for the manual acceptance and submission of optimized routes for plan operations and suppliers. Further, the transportation management system 202 may provide an enterprise placarding solution for the dynamic network transportation of STC and NDC networks.

Figure 5:
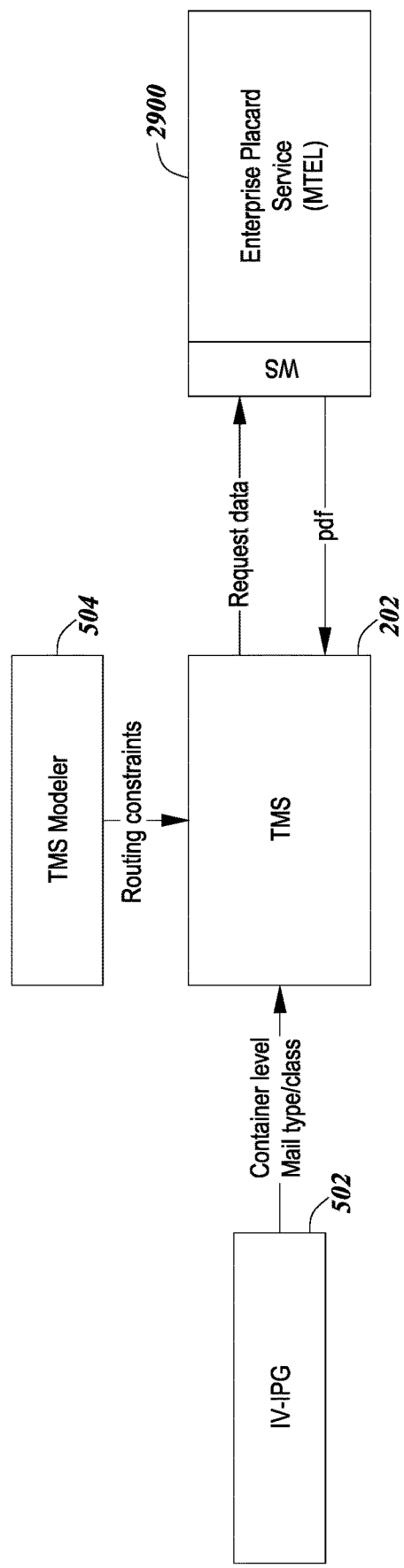
FIG. 5 shows an optimized process for generating placards using a transportation management system.

FIG. 5 is an optimized process for generating placards using the transportation management system 202. This process may include an informed visibility intelligent plan generator or IPG 502, the transportation management system 202, a transportation management system (TMS) modeler 504, and the placard generation service 2900. The IPG 502 uses transportation rules and parameters to provide container demand data such as container type, mail class and type and destination zip code ranges to the transportation management system 202. The TMS modeler 504 defines parameters for dynamic route optimization and communicates with the transportation management system 202. The transportation management system 202 applies these constraints and generates optimized routes. Once route optimization is complete, the transportation management system 202 communicates with placard generation service 2900 to retrieve the placard. Placard generation service 2900 is responsible for providing unique placard ID's for each container and has access to customization record data feeds. Transportation management system 202 then produces the placard.

Figure 6:
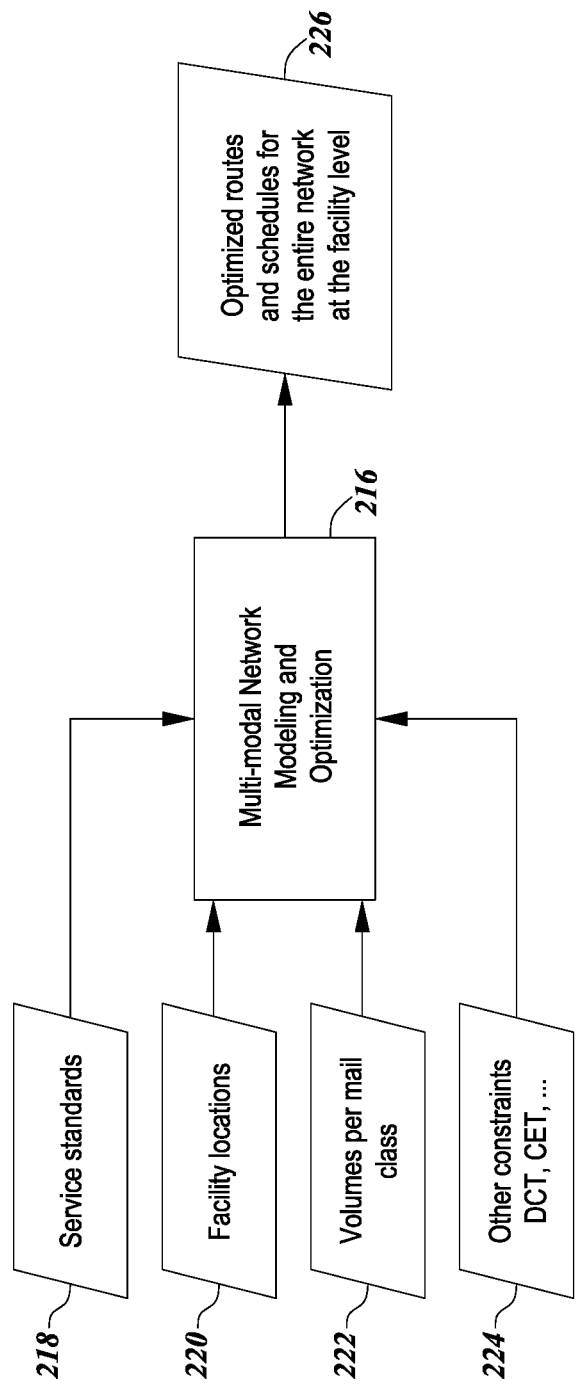
FIG. 6 shows an example embodiment of a multi-model network model used for optimization of the network at the facility level.

FIG. 6 shows an example embodiment of a multi-model network model 216 used for network optimization at the facility level. The multi-model network model 216 may take into consideration several datasets in optimizing transportation. For instance, service standards 218 are a dataset which define the maximum duration between leaving the origin and arriving to the destination by mail type. Facility locations 220 are a dataset defined by geographical locations and constraints like capacity, throughput, etc. Mail demand may be defined by data such as volume matrix that defines origin-destination pairs and volumes per mail class 222. Other constraints 224 includes operating plans, required times for mail processing, cross-dock transportation, DCT, CET, etc. Further, cost constraints may also be factored in and may be defined for each potential transportation leg, either by air or surface.

The multi-model network model 216 generates optimized routes and schedules 226 that can be used for the entire network of the ILE, including at the facility network. The multi-model network model 216 may eliminate the manual creation of dispatches. This optimizes network transportation despite changing input data and parameters. The benefits of the multi-model transportation model are optimized routes with assigned volumes. The multi-model network model 216 allows for surface and air transportation to be processed concurrently which is beneficial when meeting compliance of service standards. In some embodiments, each air transportation trip is tied to at least two surface trips: from the P&DC to the origin air stop, and from the destination air stop to the destination P&DC. Therefore, surface schedules may be optimized while air transportation will be treated as static.

Figure 7:
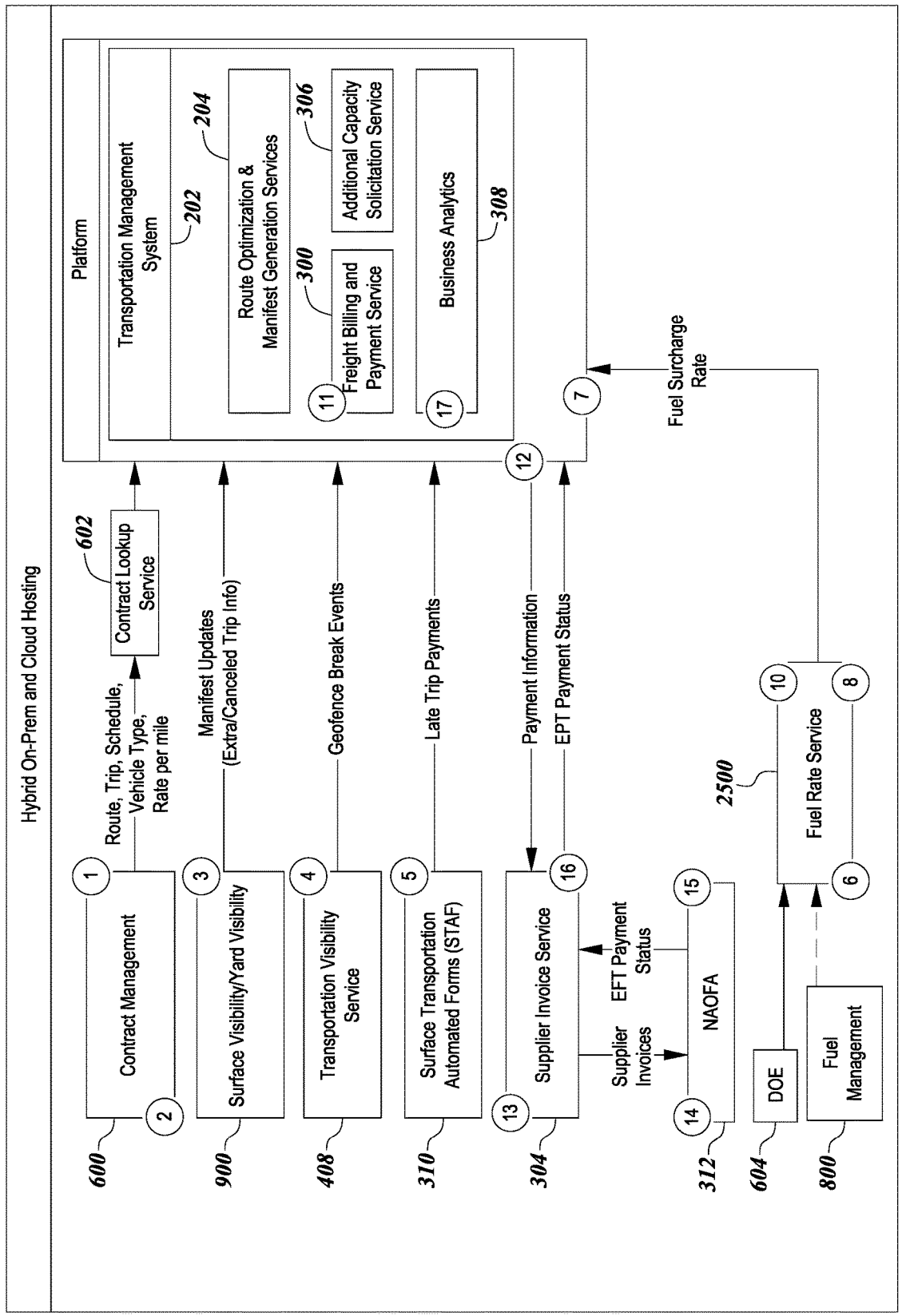
FIG. 7 shows a process flow diagram of systems and services within an ILE that contribute to freight payment.

FIG. 7 shows a process flow diagram of the systems and services within the ILE that contribute to the freight payment component 800. These systems and services operate on a hybrid of on-premises and cloud hosting. The freight payment component 800 automates the payment processing functions for all USPS transportation suppliers.

In this process, the contract management system component 600 system sends contract details, including supplier information, rates, zones, fuel rate adjustment type, and equipment information to the transportation management system 202. The contract management system component 600 maintains and adjusts supplier rates at the cost factor level, such as per annum, trip, or mile, based on contract terms and provides recurring updates to the transportation management system 202 as needed. Additionally, a contract lookup service 602 may retrieve data from the contract management system component 600 system and provide it to transportation management system 202. In some embodiments, the contract management system component 600 is hosted on-premises. In some embodiments, the contract management system component 600 is hosted on the cloud.

The integration layer 3200, while not depicted in this figure but still part of the process flow, may query fuel rate indexes by state, region, or nation, based on the department of energy fuel index rate, a custom negotiated rate manually entered, or a fuel rate provided by the fuel management component 800 or the fuel rate service 2500.

Surface visibility component 900 may send manifest updates including extra and cancelled trip information to the transportation management system 202. The transportation visibility service 408 may send proof of delivery messages and other geofence break event information to the transportation management system 202 to confirm trip execution. A surface transportation automated forms service, STAF 310, may send late trip adjustments to the transportation management system 202. The transportation management system 202 may perform an API call to the fuel rate service 2500 to retrieve contract-specific fuel rate information. If the fuel rate source for a requested contract is dynamic (involves a third-party service), the fuel rate service 2500 will call the fuel management component 800 and provide route-specific information such as origin, destination, and total miles in order to determine the fuel rate. The fuel management component 800 calculates the total fuel amount due and sends this information to the fuel rate service 2500. The fuel rate service 2500 may then provide the static or dynamic fuel rates to the transportation management system 202. The freight payment component 800 may then calculate the total payment due based on the latest manifest of planned, extra, and cancelled trips and the fuel rate for each contract-trip. The transportation management system 202 may also include late trip adjustments in the calculation and send payment details to the supplier invoice service 304. Supplier invoice service 304 may generate the invoice and send it to the national accounting oracle financial application, NAOFA 312. NAOFA 312 may issue an electronic fund transfer (EFT) payment to the HCR suppliers and send payment confirmation to the supplier invoice service 304. The supplier invoice service 304 may then send payment confirmation to the business analytics module 308. The business analytics module 308 may provide access to USPS transportation managers and HCR suppliers to access invoice and payment status details.

The contract lookup service 602 may retrieve data from the transportation contract support system (TCSS) including: contract information to transportation management system 202 for contract ID, APEX supplier ID, site ID, finance number, fuel rate source, route, trip, schedule, vehicle type, rate per mile (AOU), fuel cost and late trip data such as late payment rate and any other late payment factors or cost segment, contract effective date and contract end date, fiscal year, accounting period (AP), or tax ID number (TIN).

The supplier payment calculation may require computing the amount due for executed trips in addition to applying contract/labor related charges. After payment to the suppliers is calculated, the actual invoices may be generated by the supplier invoice service 304. Supplier payment calculation may be based on operational costs, such as trips/miles driven which may include regional fuel rates from the department of energy, DOE 604. Supplier payment calculation may also be based on contract level costs such as wage rate from the DOL.

The supplier invoice dashboard of the business analytics module 308 may provide authorized users access to their invoices and payment activity. The business analytics module 308 is a reporting and analytic system which makes reports available for authorized users. This allows suppliers self-service access for viewing payments in addition to trip manifests and invoices. A business custom gateway or the BCG is utilized for authorized access and displays the available services to the HCR supplier for shipper manifests, invoices, payment status, freight auction, etc. The transportation management system 202 and the freight payment component 800 system may share the same data repository. Thus, in some embodiments, the data created for the trips resides in the transportation management system 202 and is not required to be sent to NAOFA 312. NAOFA 312 can provide payment status information to transportation management system 202 so that suppliers can long in and view their contracts, invoices, and payment activity. Reports are accessible to view details such as invoice, description, invoice date, invoice amount, payment status, and any other specific details required by the business.

In some embodiments, the NAOFA 312 is utilized as the supplier invoice dashboard for displaying invoices and payment activity. An enterprise payment system (EPS) of the NAOFA 312 may provide reports for customers to view their invoices. These reports may provide information such as transaction ID, date, due date, amount, transaction type, description, detail, EPS account number, EPS account nickname, business location, payment method, original transaction ID, and available balance.

In some embodiments, an autopay feature of the freight payment component 800 may generate freight cost based on the freight auction component 700 (i.e. FIG. 2) adjusted carrier bids and automatically pay carriers without freight bill comparison. Within the context of the autopay feature, a "load" may represent the physical movement of freight by a carrier. A load can contain multiple shipment legs from one or more delivery locations. A "trip" may represent the physical movement of a freight by a carrier. A trip can contain multiple shipment legs from one or more deliver locations. An adjusted auction may represent the use of the freight auction component 700 where a carrier submits a flat rate bid that does not reference the current contract tariff ranges within transportation management system 202.

In some embodiments, transportation management system 202 may create freight cost estimates for transportation services based on the supplier contract and tariffs. A freight estimate may also be known as a voucher. Suppliers will submit a proof of delivery (POD) for each load, and a voucher is generated upon the POD status of the load. In some embodiments, a job scheduler feature of the transportation management system 202 creates vouchers and triggers an auto pay run. A voucher retriever API may be used to generate a file for each voucher created and stored on a shared server folder for pickup by the data integration layer 3200 to be sent to other USPS systems via the supplier invoice service 304. The supplier invoice service 304 may send remittance data back to transportation management system 202 through DIL.

According to certain embodiments, the process flow for the autopay feature may begin with a load status of open which may then be set to planned. The load then receives input from the freight auction component 700 and the status changes to tendered. At this point, a carrier or automatic feature may accept the load. Surface visibility integration may then send a supplier update and the status is changed to pickup in transit. Surface visibility integration may also provide a supplier POD and the status is changed to POD received, voucher pending. Next, the autopay feature may communicate with the transportation management financials to create and match a voucher. The autopay feature then sends a voucher retrieve API run request to the supplier invoice service 304 which may output all vouchers generated for the day. The supplier invoice service 304 then may send payment status back to the transportation management system 202 and the autopay feature which may update the freight bill payment status to paid.

The transportation management system 202 is configured to allow integration with USPS's supplier invoice service 304. The transportation management system 202 Carrier Code may be the USPS supplier's APEX ID. For each supplier that is in scope for the freight auction component 700 and freight payment component 800, a new transportation management system 202 tariff may be created. These tariffs may be restricted and disabled for use in optimization and may specifically be for the freight auction component 700 loads.

A sob server (JS) is a transportation management system 202 server that can facilitate a wide variety of tasks. It supports on demand and recurring tasks of different types, including integration, information retrieval and manipulation, and system maintenance tasks. The JS schedules instances of jobs and handles processing the job instances. For each job instance, the job type indicates what processing the JS will perform. API job types may be used to automatically handle the following events and common tasks: confirm load pick up to move load to 'in transit' status, disable 'allow continuation' on load level, generate vouchers for freight payment component 800 eligible loads, generate freight bills for freight payment component 800 eligible loads, and create output file containing all voucher information. The JS queries the queue of scheduled job instances at regular intervals and processes job instances based on their scheduled date and time. Recurring schedules allow for the definition of the schedule types such as fixed interval, daily interval, and monthly interval. If the transportation management system 202 is not able to receive a load confirmation from surface visibility component 900, the JS may be used to confirm any load that has a scheduled pick up date of the current date. By confirming the load, the load will be moved into an in-transit status. A POD cannot be provided successfully for a load without this status.

Once the freight auction load has received proof of delivery from the surface visibility component 900 system, transportation management system 202 may generate a voucher that contains the freight auction charge. The transportation management system 202 JS will use a template and request API type to kick off the autopay voucher run. Once a voucher is generated for the selected loads, JS will kick off an additional job to generate the corresponding freight payment component 800 freight bill. This will progress the financial status of the load from voucher created to voucher matched. Once the voucher and freight bill are generated for each load, a transportation management system 202 job will run to retrieve all vouchers created within a certain time frame, and a file will be generated containing all information regarding each voucher. This file will be available for the integration with the supplier invoice service 304.

The transportation management system 202 may receive POD either directly from the supplier through EDI or a manual update, or from the supplier invoice service 304 through a POD API. Transportation management system 202 may generate a file on a cadence agreed upon with USPS, containing a list of all vouchers generated since the last file generation. The transportation management system 202 will receive an update back from supplier invoice service 304 to update the freight payment component 800 bill status from not paid to paid.

Figure 8:
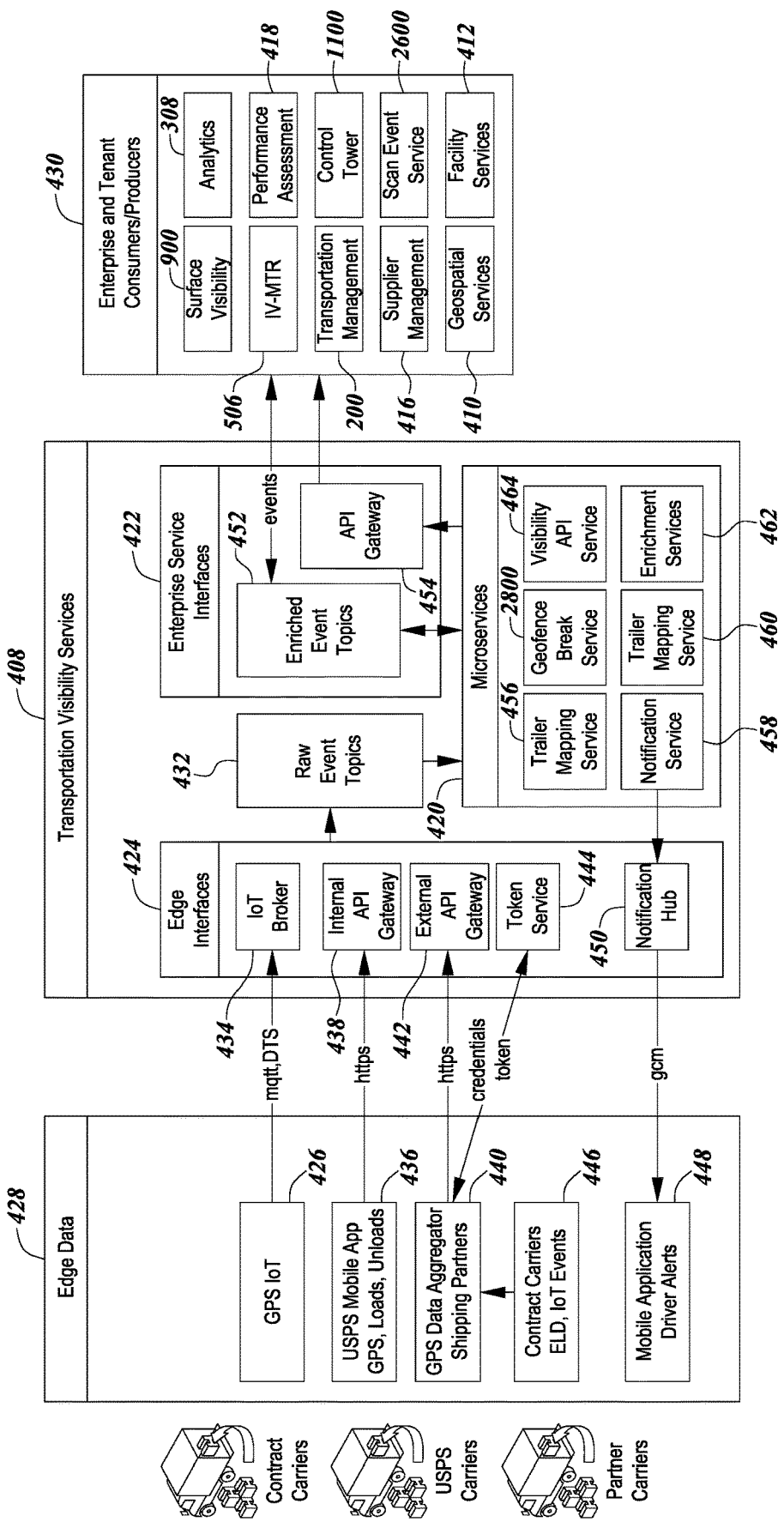
FIG. 8 is a process flow diagram of an integrated GPS component of an ILE with the associated transportation visibility service.

FIG. 8 is a process flow diagram of the integrated GPS component of the ILE with its associated transportation visibility service 408. The integrated GPS component 400 serves as the centralization of transportation visibility data collection, processing, and provisioning as an enterprise resource to the organization. Here, the transportation visibility service 408 interacts with edge data 428 and consumers and producers 430.

Edge data 428 may include data that is received from contract carriers, USPS carriers, and partner carriers. This data may include internet of things (IoT) data such as GPS IoT 426 data. Edge data 428 may also include USPS mobile application 436 data including GPS, loads, and unloads, scan events, delivery events, etc. Further, edge data 428 may include GPS data aggregator service 440 data of shipping partners, contract carrier 446 data, and mobile application driver alerts 448 data.

The transportation visibility service 408 provides visibility for USPS transportation and is based on an event-driven microservice design. Included in the transportation visibility service 408 are edge interfaces 424, service interfaces 422, microservices 420, and raw event topics 432.

The edge interfaces 424 serve as interfaces for the edge data 428. Such interfaces can include an IoT broker 434, an internal API gateway 438, an external API gateway 442, an token service 444, and a notification hub 450.

The microservices 420 provide functional services for the information that gets filtered through the edge interfaces 424 and raw event topics 432. These services may include a trailer mapping service 456, a geofence break service 2800, a visibility API service 464, a notification center 458, a container scan 460, and an enrichment services 462. These microservices are portable and may deploy on any container platform, including but not limited to PaaS and Kubernetes cloud services.

The service interfaces 422 communicate with the microservices 420 and may include interfaces such as an interface for enriched event topics 452 and an API gateway 454.

The consumers and producers 430 services communicate with the service interfaces 422. Such services may include surface visibility component 900, the business analytics module 308, IV-MTR 506, performance assessment 418, the transportation management component 200, the integrated control tower component 1100, supplier management 416, scan service 2600, geospatial services 410, and facility services 412.

GPS IoT 426 device events, such as those collected from Orbcomm and CalAmp, may initially be pulled from an API by a microservice process. GPS events may be produced on raw event topics 432. GPS breadcrumb events may then be validated, standardized, and enriched with trailer data by the loosely coupled trailer mapping service 456. Enriched data may be placed on the enriched event topics 452. In some embodiments, the GPS devices could send such events to an IoT gateway such as an MQTT proxy or IoT event hub.

Contract carriers 446 may integrate with a data aggregator service 440. This data aggregator service 440 may push data to a secure USPS API such as the external API gateway 442. Shipping partners may also use the external API gateway 442 with the token service 444 to securely send GPS breadcrumb events to the transportation management system 202. USPS mobile application 436 devices may initially send enriched GPS data to a message queue (MQ) or may be reconfigured to push data to the internal API gateway 438 over a virtual private network (VPN). GPS events may be consumed, validated, standardized, and enriched by microservices 420. Standardized events will be placed on the enriched event topics 452 such as enriched breadcrumb topics. Enriched breadcrumb topics may provide source of truth (SoT) events to tenant consumers and producers 430 such as the transportation management system 202, integrated control tower component 1100, surface visibility component 900, IMVIS, and business analytics module 308.

A breadcrumb microservice may consume the enriched event topics 452 such as the enriched GPS events and store them in a datastore keyed on Trip ID. The lightweight visibility API service 464 may serve vehicle tracking results. Security and other policies for the gateway may be controlled by the API manager. The API gateway 454 may serve trip breadcrumb data to tenant consumers and producers 430.

The geofence break service 2800 may retrieve breadcrumb events ordered by timestamp from the datastore for each trip and produce geofence break events for all trips/routes and locations. These events may be published to a geofence break topic to provide SoT events to consumers and producers 430.

The geofence break service 2800 may consume the enriched geo fence break events and store them in a NoSQL datastore keyed on vehicle and trip ID. The lightweight visibility API service 464 may serve geofence break results. Tenant consumers and producers 430 services may use this API to request geofence break information for vehicles and trips.

Figure 9:
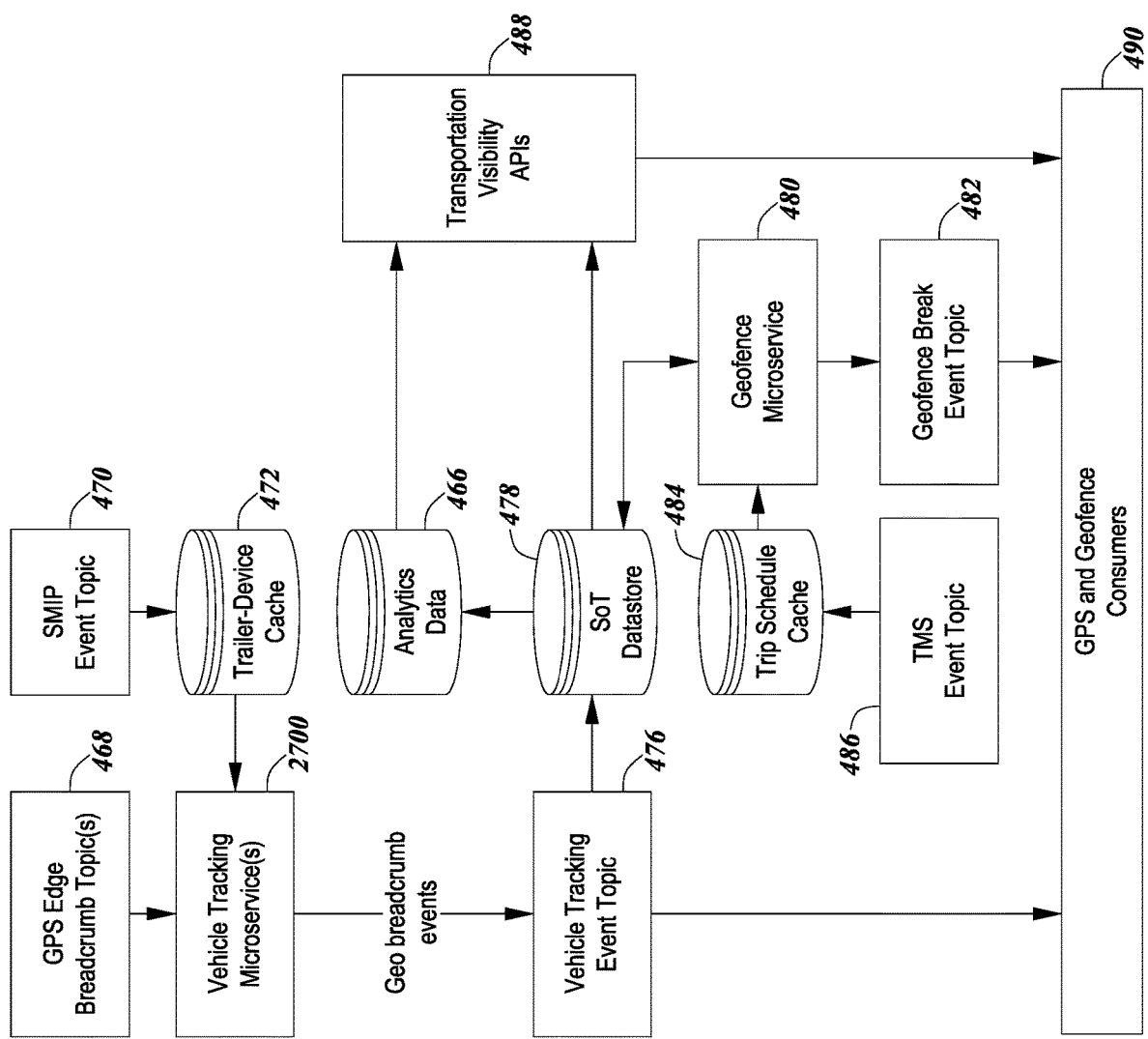
FIG. 9 is a process flow diagram of a GPS breadcrumb and geofence break service including transportation visibility API's.

FIG. 9 is a process flow diagram of the GPS breadcrumb and geofence break service (e.g. 2800) including the API gateway. To begin the process flow, an enterprise GPS interface layer ingests GPS breadcrumbs and produces events on a breadcrumb topic 468. Source of truth (SoT) trailer-device match data is consumed from an event topic 470 and placed in a local datastore or trailer-device cache 472. A vehicle tracking service 2700 consumes the breadcrumb events and matches device ID to a trailer and produces an enriched GPS event such as the vehicle tracking event topic 476. The enriched GPS breadcrumbs are consumed and placed on a SoT datastore 478. A geofence service 480 retrieves breadcrumb data in trip time slices to determine geofence breaks in and out of facilities to produce geofence break events 482. The geofence service 480 retrieves the trip time slices from a trip schedule cache 484 which ingests TMS event topics 486. The geofence break events 482 are stored in the SoT datastore 478. API's and event topics, such as the transportation visibility API 488 receive data from the analytics data 466 service and the SoT datastore 478. The transportation visibility API 488 further provides GPS and geofence events to GPS and geofence data consumers 490. The geofence data consumers 490 also receives data from the vehicle tracking event topic 476 and transportation visibility API 488. This data is archived in an analytics datastore or cloud storage.

GPS breadcrumb data is important for several key functions of the integrated logistics ecosystem 100. One of these functions, invoice verification, may use breadcrumbs to verify EDI invoice data submitted by contract carriers and partners. Breadcrumbs may also be a key data element to determine geofence break events which are used to determine on-time performance of trips. Other functions include using breadcrumbs to trigger driver and manager alert notifications and predict late arrivals.

Figure 10:
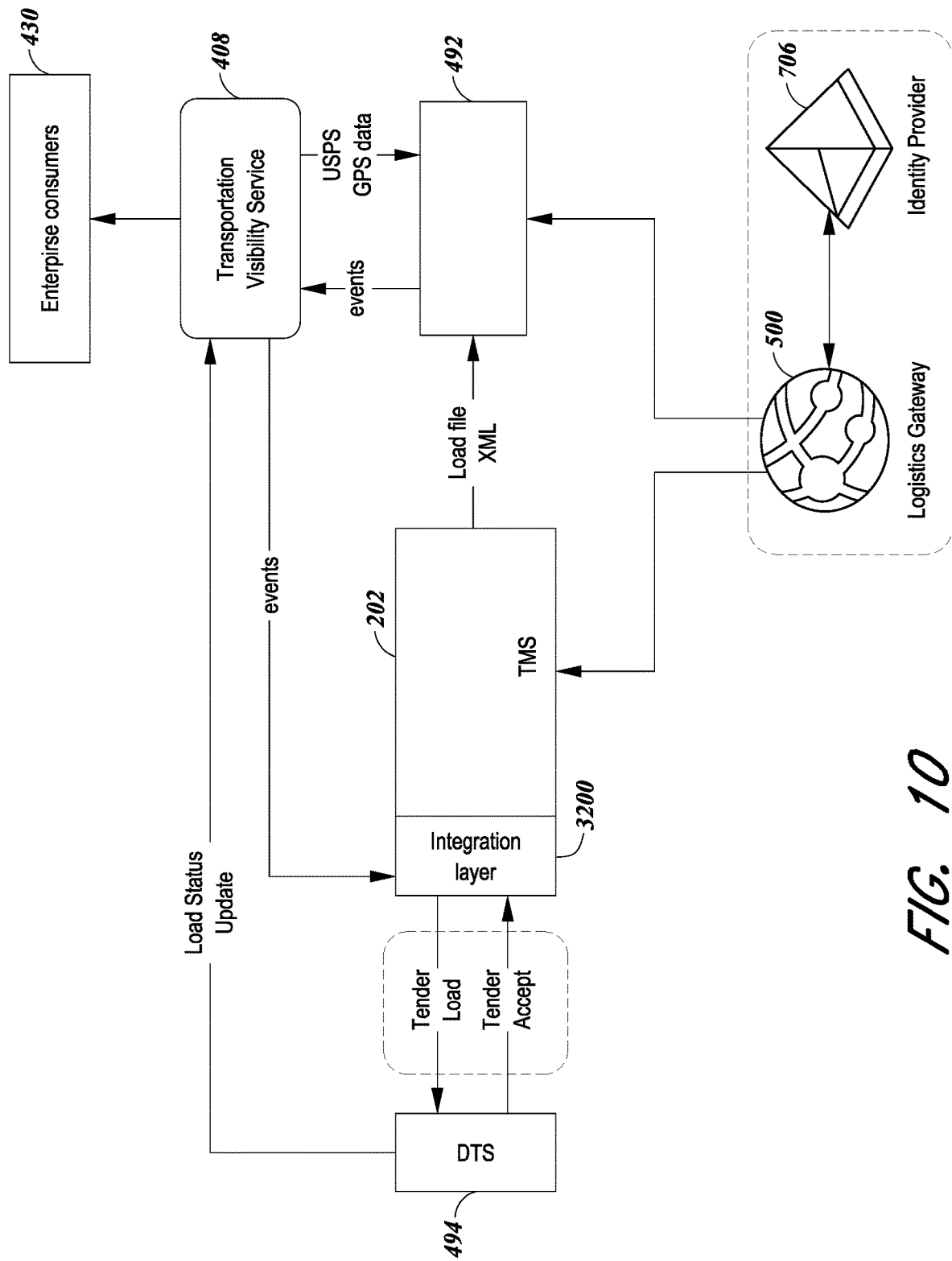
FIG. 10 shows interaction between the transportation visibility service and a third-party visibility platform.

FIG. 10 shows the interaction between the transportation visibility service 408 and a third-party visibility platform 492. The transportation visibility service 408 provides functions such as visualization, reporting, notification, and data provisioning of the transportation data.

The integration layer 3200 of the transportation management system 202 may interact with a data transfer service 494 through a digital message exchange. The data transfer service 494, in turn, may communicate with the suppliers. The transportation management system 202 may relay information relating to a tendered load, and the data transfer service 494 may relay information relating to the acceptance or denial of the load. The integration layer 3200 may further receive event data from the transportation visibility service 408 and SV container scans.

The transportation visibility service 408 may receive load status updates from the data transfer service 494. The transportation visibility service 408 may further receive data such as SV trailer scans and other edge device data such as GPS and RFID etc. The transportation visibility service 408 may receive event data from the third party visibility platform 492 and sends USPS and GPS data to the third party visibility platform 492. The transportation visibility service 408 may send data to the consumers and producers 430 services.

The third-party visibility platform 492 may also receive mobile data, Orbcomm data, and ELD data.

The logistics gateway component 500 may be accessed by suppliers and internal users. These internal users may also access the transportation management system 202 directly. The logistics gateway component 500 interacts with an identity provider 706 to confirm identity and for security purposes. The logistics gateway component 500 provides access to the transportation management system 202 and the third-party visibility platform 492.

The transportation visibility service 408 component may provide visibility for USPS transportation and provides the following capabilities: GPS data repository, edge interfaces to load and transform GPS data from various sources into a unified GPS data stream; proof of delivery service, load status service, and USPS GPS data provisioning to the third party visibility platform 492. The transportation visibility service 408 may also provide output data streams and topics for consumers to subscribe to such as the proof of delivery, load status, and unified GPS data stream associated with loads.

In certain embodiments, the third-party visibility platform 492 is a transportation visibility platform that provides a single integration point between the transportation management system 202 and various transportation suppliers to achieve near real-time transportation visibility. Some of the functionalities of the platform include associating loads with supplier GPS devices to enable tacking, providing GPS data, geofence break events, and various other notifications for actions listed herein, and providing transportation visibility, analytics, reporting, and dashboards. In certain embodiments, the third-party visibility platform 492 is a real-time truckload tracking solution provider, that tracks current locations of assets while computing estimated times of arrival or ETA's to the next stop. Load, stop, and carrier information is shared with third party visibility platform 492 to enable the tracking process. Third party visibility platform 492 transmits location and ETA information of the tracked trucks to the transportation management system 202 to enable real-time visibility.

Some of the notifications that can be configured within the third party visibility platform 492 and consumed by the transportation visibility service 408 include the following: pre pickup notifications such as load not assigned, load not picked up, appointment rescheduled by shipper or by carrier, and time to pick up appointment; in transit notifications such as early, on-time, late, and very late; at stop/ delivered notifications such as arrived at pickup, departed pickup, auto pickup, manual pickup, geofence pickup, arrived at delivery, departed delivery, auto delivery, manual delivery, and geofence delivery; and miscellaneous notifications such as time to delivery appointment, new load comment, truck not moving notifications such as at stop or on route, and no new updates.

The process flow of the third-party visibility platform 492 delegates the association between the load and the schedule to the carrier and is initiated by the transportation management system 202 providing load data such as scheduled trips to the third party visibility platform 492. The third party visibility platform 492 may exchange messages with each transportation supplier to establish association between loads and supplier's GPS devices. Location information may be provided to the third party visibility platform 492 by the supplier's transportation management system 202, the suppliers electronic logging device (ELD), or the third party visibility platform 492 mobile app used by the supplier's drivers or autonomous vehicles.

Transportation visibility at the trailer level may be achieved by associating load ID, GPS device, and SV barcode. The association between a load and a GPS device may be established between the supplier and third-party visibility platform 492 where the supplier integration and onboarding enables the required data flow. Before picking up a load, the supplier may send a message to third party visibility platform 492 to allow third party visibility platform 492 to establish association between the load and the GPS device to be used for tracking. Association between the load ID and the SV barcode is made when SV scans a trailer barcode.

The integrated logistics ecosystem 100 may utilize ETA breadcrumb and geofence functionality to create smaller and more easily managed service domains. Each of these service domains may incorporate on-time reports and payment processing services with accurate and timely trip data available via the transportation visibility API's and event streams to accurately determine trip status. These service domains may further incorporate high-availability, fault-tolerant design such as Kafka multi data center, Kafka event replication, and Kubernetes clusters. This additionally allows for use of independent databases using the technology that best aligns to the services. Further, this allows for incorporation of horizontal auto-scaling where Kubernetes pods will scale automatically based on demand and processes will scale out during peak and after failures. Further benefits include a decoupled functionality by design where if a single service domain encounters a failure or problem, it will not affect any others. For instance, an ingest failure would result in delayed events but the transportation visibility API would never be unavailable or require a failover process. Finally, the agility and speed to Market will increase by making enterprise SoT data available as event streams and APIs. This will greatly reduce the complexity to produce or consume transportation events.

The integrated logistics ecosystem 100 may also include an IoT hub which serves as a central platform which is suited for telemetry such as GPS trackers and other sensor. This allows for asynchronous processing of events which reduce latency issues associated with pulling data repeatedly over the cloud agnostic network (CAN) via synchronous API requests. This allows for containerized processes and API's to be deployed to both the data center and cloud 104 which enables services to consume events and API's without additional roundtrips over the CAN.

Orbcomm, CalAmp, and MVA-TV devices may be used to collect scan data and GPS data and are used as GPS trackers.

Figure 11:
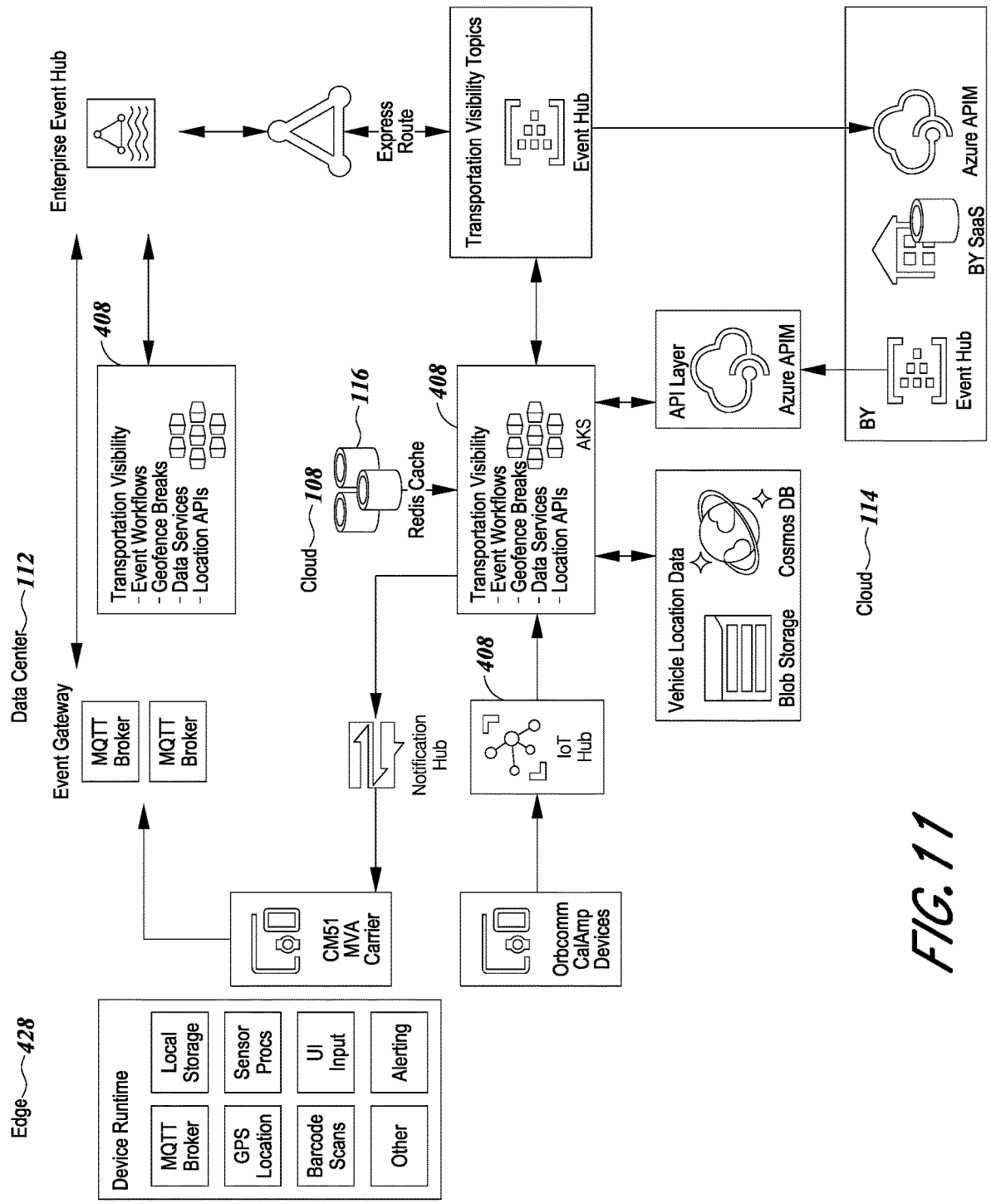
FIG. 11 shows an overview of USPS cloud integration within the integrated logistics ecosystem.

FIG. 11 is an overview of the USPS cloud 108 integration within the integrated logistics ecosystem 100. The USPS cloud 108 includes an IoT hub 110 with events mirrored to on-premises and cloud topics. The IoT hub 110 provides a central IoT platform specially suited for telemetry such as GPS trackers including Orbcomm, CalAmp, MVA-TV, and other sensors. This allows asynchronous processing of events which minimizes latency issues associated with pulling data repeatedly over the Cloud Agnostic Network (CAN) via synchronous API requests. Containerized processes and APIs may be deployed to both the data center 112 and the USPS cloud 108 to allow enterprise services and tenant services to consume events and APIs without additional roundtrips over the CAN thus minimizing the use of additional network bandwidth.

The MQ message queues and Oracle Analytics datastore will be leveraged for geospatial processing. The integrated logistics ecosystem 100 will utilize an OLTP-optimized NoSQL datastore and Redis Cache 116 for improved performance, elasticity, replication and multi-region redundancy. A direct network route between the USPS cloud 108 and cloud 114 environments will reduce latency between the two systems.

Figure 12:
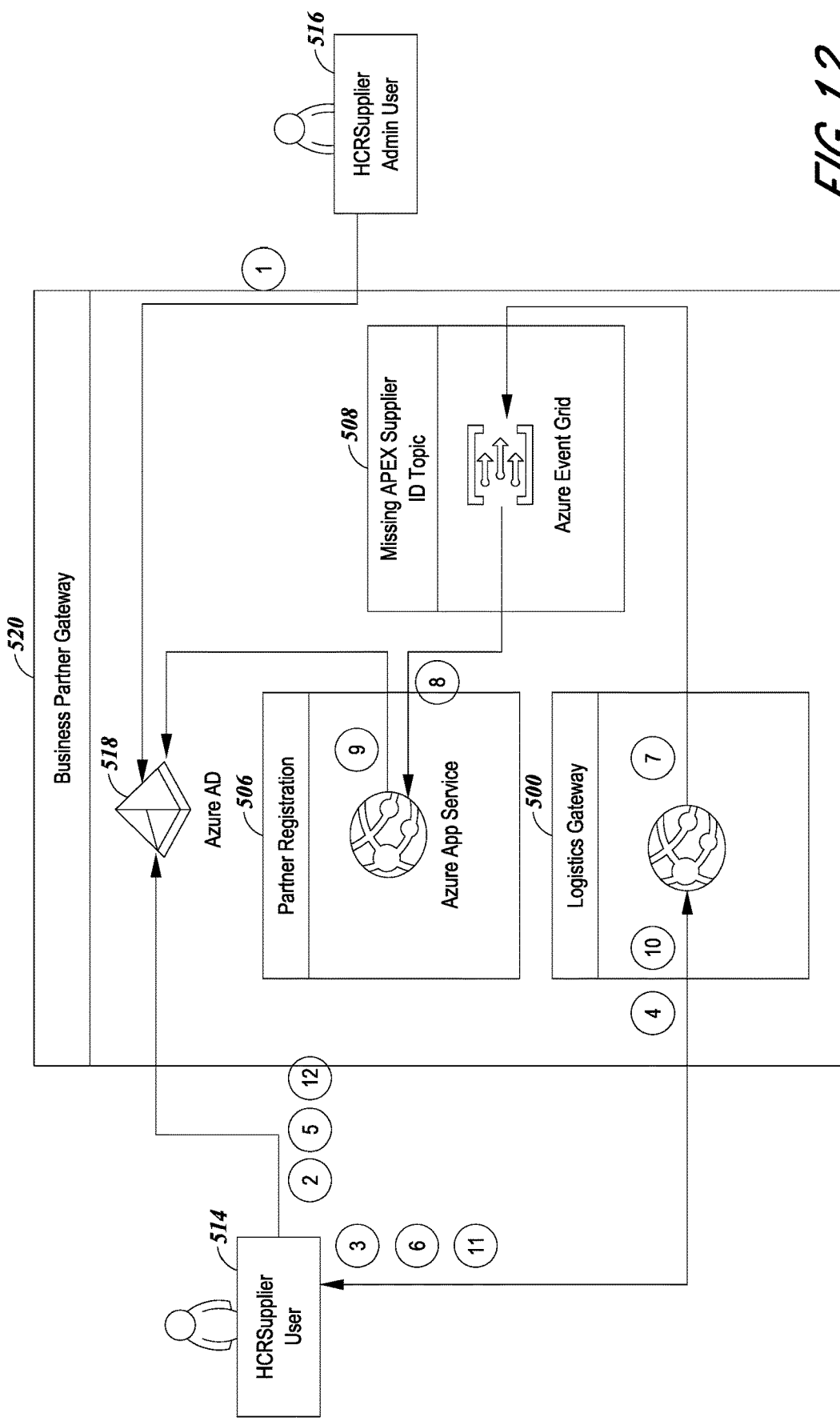
FIG. 12 is an overview diagram of a logistics gateway as integrated into an ILE.

FIG. 12 is an overview diagram of the logistics gateway component 500 as integrated into the ILE. The logistics gateway component 500 allows for partner and supplier access to key logistic, contract, and payment processing information.

A business partner gateway (BPG) 520 includes features that allow users to interact with the rest of the integrated logistics ecosystem 100 components. These users typically fall within two categories, HCR supplier user 514 and HCR supplier admin user 516. The BPG 520 consists of the logistics gateway component 500 a partner registration 506, and an active directory or AD 518.

The BPG 520 may be used for partner and supplier administration onboarding. According to certain embodiments, the onboarding process may include the following: The supplier establishes an electronic fund transfer (EFT) account in the NAOFA 312 where the APEX supplier ID is created. USPS accounting then notifies USPS supply management when the APEX supplier ID is created. Supply management uses the partner registration 506 app to enter supplier information such as company name, domain name, APEX ID number etc. The partner registration 506 app stores the collected information such that it is retrievable by domain name, executes an API to add the company as a connected organization on all integrated logistics ecosystem 100 catalog access packages; and notifies downstream systems of the new organization. Supply management may then use the partner registration 506 portal to invite an HCR supplier admin user 516 to register for an AD 518 guest account, the HCR supplier admin user 516 then completes account setup. Partner registration 506 may then add HCR supplier admin user 516 as an external sponsor to associate the Apex ID to the HCR supplier admin user 516. Partner registration 506 may use an API (such as Microsoft Graph) to add the HCR supplier admin user 516 as an external sponsor on all integrated logistics ecosystem 100 catalog access packages. Partner registration 506 may configure the APEX ID in a user extension attribute. The HCR supplier admin user 516 may add previously invited users as external sponsors using partner registration 506. Partner registration 506 may use an API to add additional external sponsors. Downstream components will then be passed the application role and APEX ID as part of the onboarding protocol.

The BPG 520 may also be used for granting partner and suppliers authorized access. According to certain embodiments, this process includes the following: The HCR supplier admin user 516 invites an HCR supplier user 514 to the logistics gateway component 500. This invitation may be via email or through the logistics gateway component 500 access package. The HCR supplier user 514 completes the registration process and navigates to the logistics gateway component 500 application which integrates directly with AD 518 as the identity provider. The logistics gateway component 500 redirects the user to AD 518 login to authenticate the user the user is redirected back to logistics gateway component 500. The logistics gateway component 500 may detect whether the APEX ID topic is empty and notify partner registration 506. The partner registration 506 finds the domain record and assigns the APEC ID to the user.

Once the HCR supplier user 514 is onboarded to the logistics gateway component 500 the user is presented with several accessible components. An API may be utilized to determine if previous access has been obtained. The user is able to access the components if previous access was obtained, otherwise the user will request access.

In certain embodiments, several integrated logistics ecosystem 100 components need access to the suppliers assigned trailer and device fleet information. To accommodate this need, a security mapper, such as the security mapper identity provider (SMIP) may ingest existing supplier, trailer, and device mapping data from SEAM and provide access to the data to the remaining integrated logistics ecosystem 100 components such as the integrated control tower component 1100. The security mapper may publish the information for downstream consumers including integrated logistics ecosystem 100 components.

In certain embodiments, the AD 518 is utilized to define and maintain supplier user roles within the separate integrated logistics ecosystem 100 components. Each link provided within the logistics gateway component 500 may map to one user role. The different user roles within the integrated logistics ecosystem 100 include but are not limited to a carrier manifest within the business analytics module 308, a supplier invoice dashboard of the supplier invoice service 304, freight auction response, transportation visibility service 408, solicitation response and signature, and submission and dispute of trip exception forms.

Several applications interface with and trust AD 518, these applications may include but are not limited to: partner registration 506 which allows the creation of connected organizations and allows external sponsors to add additional sponsors for ILE access packages; the logistics gateway component 500 which serves as the landing spot for requesting access and navigating all ILE components; a carrier manifest within transportation management system 202; solicitation within contract management system component 600; supplier invoice dashboard within supplier invoice service 304; freight auction 700; transportation visibility service 408; and trip execution forms.

A catalog for the integrated logistics ecosystem 100 may be located in the AD 518 with an access package for each external internet facing partner resource requiring access control. These access packages of the catalog may be created for each application within AD 518 and may be configured with one or more applications. Application roles are provided in the access package.

Each access package can be configured with connected organizations. The connected organizations have a property for external sponsors. An external sponsor can send invitations to new users who share the same domain as the connected organization.

In certain embodiments, a directory schema extension may be used to manage the APEX supplier ID. The logistics gateway component 500 application may hold directory schema extension. Mappings may be used to add extended claims to each application registered in the ILE catalog. An API may be used to update the extension attribute.

Figure 13:
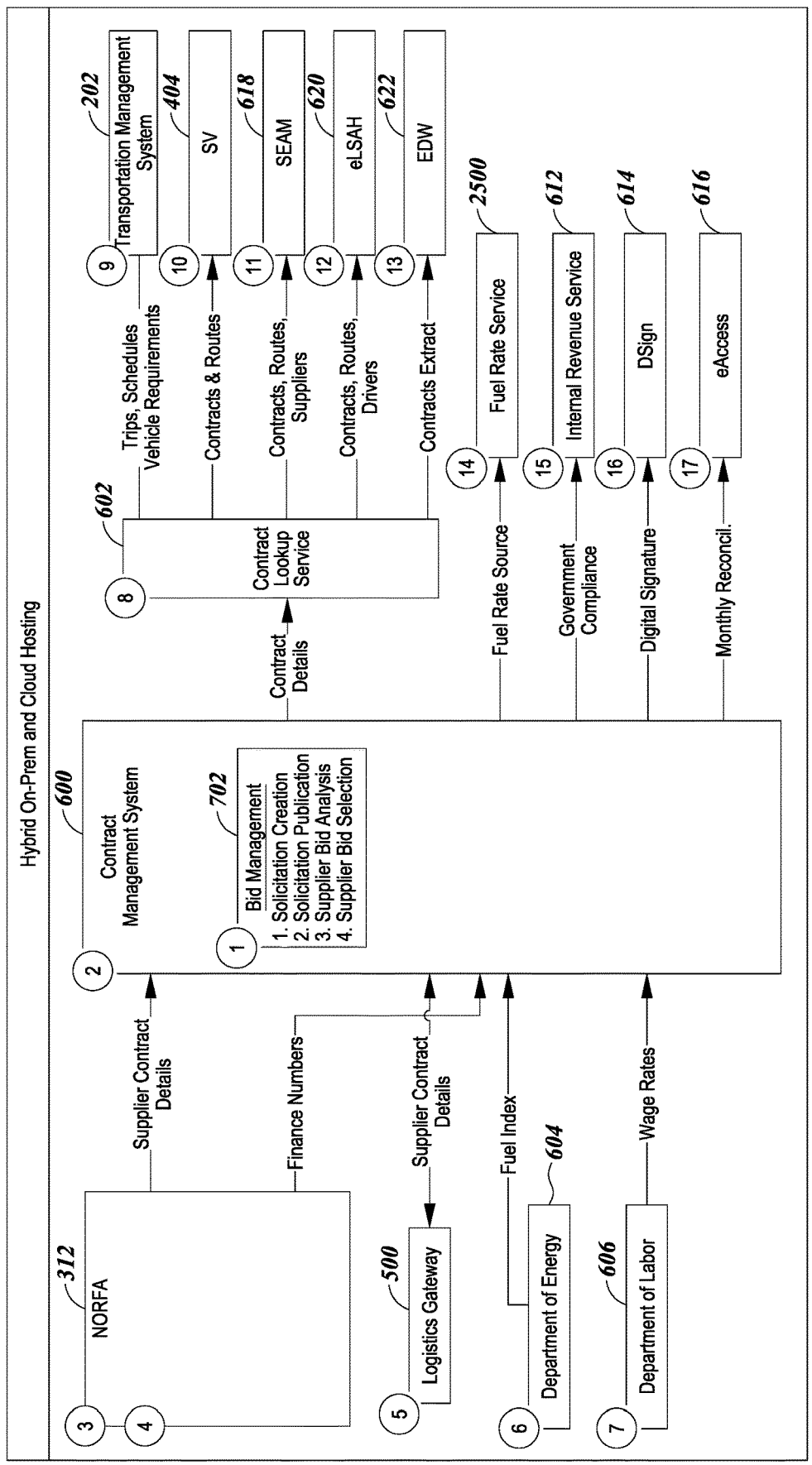
FIG. 13 is a high-level process flow diagram of an example embodiment of a contract management system.

FIG. 13 is a high-level process flow diagram of an example embodiment of the contract management system component 600 component and how it integrates with other systems and data. The contract management system component 600 enables integrated end-to-end execution and visibility of the contracting process.

The contract management system component 600 system handles contract creation, contract administration, payment attributes management, and supplier management. The solicitation bid management service 702 is incorporated into the contract management system component 600. The solicitation bid management service 702 handles solicitation creation, publication, bid analysis, and bid selection. The solicitation bid management service 702 is used to solicit and award bids. The contract management system component 600 system is further used to write contracts and monitor contract compliance as well as key activities performed by TCSS for transportation contracts. Suppliers are enrolled for EFT processing in NAOFA 312 by the USPS accounting service center and the contract management system component 600 may track the invoices and associated payment history. The logistics gateway component 500 may provide a link for contract management system component 600 in order for suppliers to respond to solicitations and view status of their contracts. The contract management system component 600 may provide a dashboard access to the suppliers for viewing status of USPS remittance. The contract management system component 600 may send routes, trips, schedules and vehicle requirements to the transportation management system 202 for optimizing and scheduling operations. The contract management system component 600 may send contract details to the contract lookup service 602 and also send fuel rate source information to the fuel rate service 2500. The department of energy 604 (DOE) sends the fuel index to the contract management system component 600. The contract management system component 600 receives wage rates from the department of labor 606 (DOL). The contract management system component 600 may create legally required extracts for the internal revenue service 612 (IRS) each quarter. The contract management system component 600 may send contract and route data feeds to the SV mobile application 404 and sends contract, route and supplier data feeds to solution for enterprise asset management 618 (SEAM) application. The contract management system component 600 may send contract, route and hired driver data feed information to an eLASH 620 application (eLink Security Application Hub). The contract management system component 600 may send data to an EDW 622 (Accounting Data Mart). The contract management system component 600 may further sends digital signatures to an integration with electronic signature application (DSign), Dsign 614, which is to capture signatures on the contract and uploads to a contract document repository (CDR). The contract management system component 600 may further send monthly reconciliation to eAccess 616 which is an integration with the contract management system component 600 for real-time provisioning of user access and a monthly SOX reconciliation process.

The solicitation bid management service 702 supplies management specialists to prepare, solicit, negotiate, and manage contractual agreements with HCR suppliers. The contract management system component 600 creates and manages transportation contracts and related activities and supports contract cost adjustments and negotiated rates to pay suppliers for services. The SV mobile application 404 collects data at the handling unit level (sacks, trays, tubs) to track mail through each site and the entire transportation network and has a feed of the TCSS contract route data. The eLASH 620 facilitates the submission and subsequent approval of security clearances for Highway Contract Drivers. This includes the submission of necessary paperwork and authorizations needed to process a background check for an individual. eLASH 620 is a part of the HCR Contract Route Background Investigations DAR. The eLSHA system may a feed of TCSS contract routes and hired driver or autonomous vehicle data. Dsign 614 may capture signatures on the contract and uploads to a contract document repository (CDR).

The solicitation bid management service 702 allows for solicitation and procurement from logistics service providers and streamlines the process to capture requirements, create solicitation package and manage bids received. The solicitation bid management service 702 may also perform comparative analysis on bids received from suppliers for transportation lanes and routes, provide detailed vehicle requirements, provide information on trips and schedules, and notify suppliers of an initial award based on cost savings and past performance.

The contract management system component 600 manages contracts from initial award to the ongoing management and eventual renewal or termination. This includes managing the terms and conditions of the contract, required signatures and supporting legal documents while also meeting government compliance and audit requirements. Transportation specific items of the contract management system component 600 may capture specific contract requirements such as annual base rate, per trip rate, round-trip rate, cost per hour, or rate per mile as specified in the solicitation.

Each transportation contract consists of several cost data factors such as fuel price per gallon as fuel price is adjusted upward or downward for each contract using DOE published rates and fuel indexing. Supplier invoices may be generated using adjusted cost data and then sent to accounts payable for final payment.

According to certain embodiments, the transportation solicitation and bid management is unique for three types of contracts: HCR which may be static trips, Contract Delivery Services (CDS) which may also be static, and eDRO contracts. The eDRO contracts, as defined by TCSS, do not contain any trip information and are maintained in TCSS.

Figure 14:
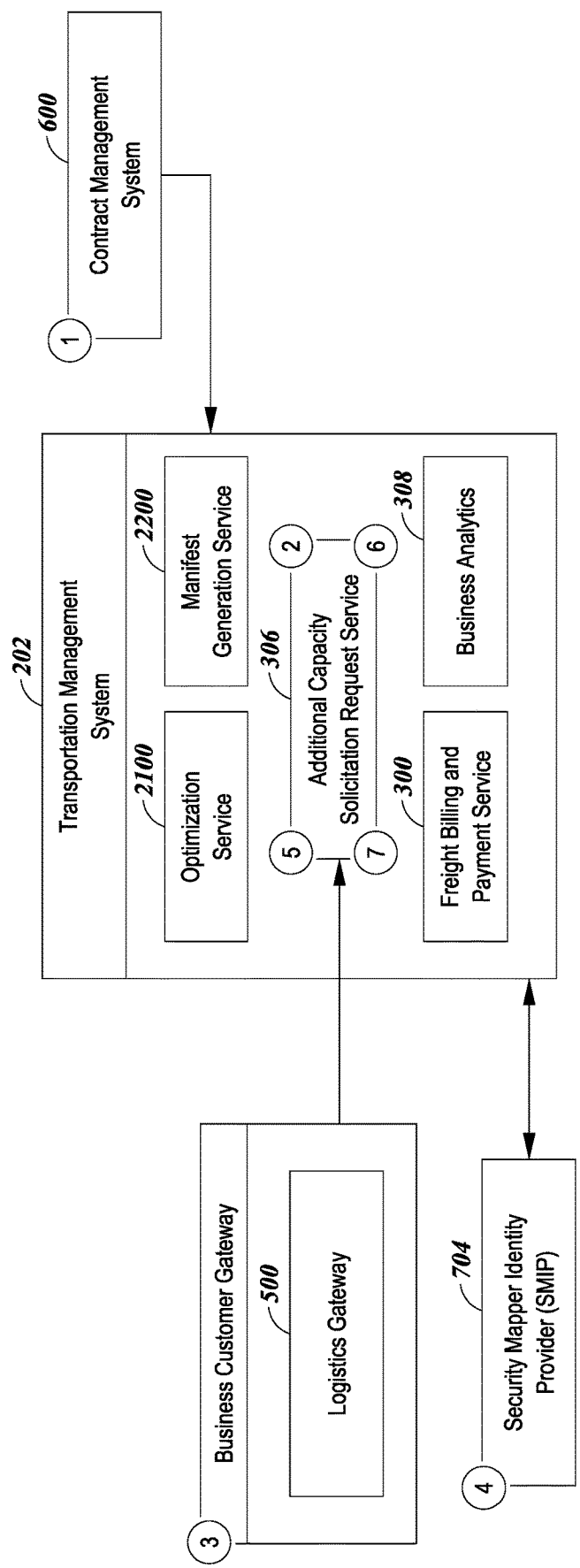
FIG. 14 is a process flow diagram of a freight auction component of an ILE.

FIG. 14 is a process flow diagram of the systems and services supporting the freight auction component (e.g. 700) of the ILE and it's associated additional capacity solicitation service (e.g. 306). Within this process, the transportation management system 202 enables digital solicitation and selection of transportation services to suppliers which have pre-established contracts enabled for freight auction.

According to certain embodiments, this process flow includes the following: The transportation management system 202 may load suppliers and rates into the freight auction component 700 service. Next, a USPS transportation specialist at a local site may request ad hoc transportation from HCR suppliers via the the freight auction component 700 service within transportation management system 202. HCR suppliers may gain access to the transportation management system 202 through the logistics gateway component 500. The security mapper identity provider, SMIP 704 provides user session and authorization data to the transportation management system 202. The transportation management system 202 may initiate a user session and assigns the appropriate user role based on the SMIP 704 authorization data. The HCR suppliers review and respond to USPS transportation requests in the additional capacity solicitation service 306 of the transportation management system 202. USPS transportation specialist analyzes supplier responses in the transportation management system 202 and selects the best transportation option. If the lowest cost option is not selected, the specialist may indicate the reason for the selection. HCR suppliers may then be notified of the USPS selection in the transportation management system 202. The contract management system 600 works with the transportation management system 202 to generate contracts for the accepted bids. Within the transportation management system 202, the optimized transportation service 2100, manifest generation service 2200, freight payment component 800, and business analytics module 308 may all contribute to the freight auction process.

The logistics gateway component 500 may provide a link to the freight auction component 700 within the transportation management system 202. The SMIP 704 may define the HCR supplier roles for the freight auction component 700 access and provide authorization capabilities to the transportation management system 202. The freight auction component 700 may additionally integrate with the contract management system component 600.

Freight auction may occur with the following steps: First, supplier onboarding enables external access to the freight auction component 700 functionalities within transportation management system 202. Second, trips are created to be auctioned. Third, eligible suppliers are notified of the posted auction. Fourth, bidding between suppliers occurs. Fifth, the most competitive bid is selected. Sixth, winning and losing bidders are notified. Finally, data is provided to downstream systems for trip execution.

Freight auction can be used to optimize trips that are planned and scheduled through the freight auction component 700 module, surface visibility component 900 initiated trips, and air transport exceptions such as when containers are sent back from terminal handling services (THS) due to capacity overload.

Each supplier in the transportation management system 202 may have an assigned geographical region, or zone, that defines its area of operation. Based on the zones, the freight auction component 700 may determine eligible suppliers for the extra trip, create the auction, and notify the suppliers. Each auction has an expiration date. Communication between transportation management system 202 and the suppliers may be conducted via email or an automated digital message system between the transportation management system 202 and suppliers.

The bidding process may be performed manually by suppliers logging into transportation management system 202, by sending digital messages, or by a broadcast tender load response. All bids may be submitted before the auction expiration date and time. Bid selection within transportation management system 202 may be manual or automated. This selection process may weigh various factors such as lowest bid price and a supplier's score. Similar to notifying suppliers of a posted auction, suppliers get notified of the selection results either by digital message, or other supported channels of communication.

Once a supplier has been assigned the auction trip, the information may flow to the downstream systems. These systems include but are not limited to TOPS 206, Placard generation service 2900, and surface visibility component 900. TOPS 206 creates dispatches and provides the data to Placard generation service 2900 for placarding. Surface visibility component 900 receives the information on extra trips and assigned suppliers so it can scan containers and trailers associated with the trip and therefore provide transportation visibility.

The freight auction component 700 may be a module of the transportation management system 202 and may use transportation management system 202 capabilities and functionality to support the contracted supplier rates and generate the tender and acceptance of loads that are awarded in the freight auction component 700. Freight auction reports can be run against business analytics module 308 warehouse schema. Both TOPS 206 and surface visibility component 900 systems have visibility to the loads tendered and event tracking updates provided to suppliers. In addition to TOPS 206, USPS web based applications will support extra load entry and data sources to allow automating data into transportation management system 202. TOPS 206 may serve as a backup to the web based applications during peak demand.

The the freight auction component 700 allows for supporting peak capacity demands for all USPS NDC's, STC's, THS's and associated USPS Annexes. The freight auction component 700 may handle demands in excess of 800 separate locations. Peak capacity is when USPS surges in demand and the need for capacity exceeds what is available from the primary contracted suppliers.

The the freight auction component 700 may be utilized by a Load Control Center to cover demands for capacity. There may be 13 Divisions divided into 4 Regions. These 13 Divisions may be supported by 43 Surface Planners for all regions. The Surface Planners are responsible for load entry into the transportation management system 202, monitoring and approving of the extra load capacity demands, evaluation of bid responses and management of each load from bid to load completion within the freight auction component 700.

The Processing Network Transportation (PNT) office, when operating, may serve as a point of contact for the 43 Regional Surface Planners, providing process oversight, issue resolution, facilitation, etc. It is not required that the PNT operationally utilize the freight auction component 700 to obtain additional capacity.

Load request may be completed by a TANS manager, TANS manager supervisor or network specialist of requesting site via Blueshare or TOPS 206. The load request process may be available in both Blueshare and TOPS 206 teams for peak demand readiness. Load data may be pushed to an API prebuilt load template for the surface planner to upload to the transportation management system 202. Once in transportation management system 202, these loads may be automatically sent to the freight auction component 700 to start an auction.

Preselected USPS network suppliers may be invited to participate in an auction to bid on extra capacity demand loads. Suppliers may be asked to enter a flat all in bid amount for each load if they are able to make the pick up time for each bid and submitted bid. The supplier that provides the lowest bid per auction will be awarded the load. If the supplier is unable to make pick up time, they will be prompted to enter a flat all in bid amount and time they may make a load pick up or decline a load. If there are no bids that can make the load pick up time at auction completion, then the surface planner will review the load bid history-declined view to determine if any suppliers could add time to make pick up and their bid amount. The surface planner may make a decision contrary to these conditional bids and manually award bids based on earliest pick up and lowest bid amount and manually award a load to supplier.

There may be bid threshold configurations within the freight auction component 700 and reporting to monitor supplier bidding amounts. A decision may be made, based on these audits, that may change the required scope from supplier all in bids by load to the current state process of using supplier contract rates based on OLD pairs. This configuration may be completed and ready in the transportation management system 202 to activate and a communication plan will be established to notify suppliers that they will be going back to using the contracted rates. This process may be documented in an SOP and presented to all stakeholders.

The freight auction component 700 is an available module of transportation management system 202, and is accessed through the standard navigation panel for users authorized to the functionality. There is distinct access for each of the three different user types, the administrator, supplier and employee users. Each of the user types have specific functionality made available to them, based on the role and requirements of that user type. Administrator users set up the the freight auction component 700 system within transportation management system 202 and manage the auction configuration and user roles. Supplier users access the freight auction component 700 via the logistics gateway component 500 and are allowed to respond to the auctions they have been invited to participate in. Suppliers can monitor the status of an auction, as well as review their previous auction bid results, update load events from their access as well. These different views are managed in the supplier view using the Freight Auction, Bid Status, and Bid History tabs and the transportation management system 202 user interface.

Employee users may access the freight auction component 700 to monitor auctions, review supplier bids and award loads to a supplier as needed. This may be managed in the employee view using the freight auction, awaiting auction, awarded loads, and bid history tabs and the transportation management system 202 user interface.

According to some embodiments, some suppliers will be eligible to participate in the freight auction process for the peak demand period. These suppliers will be used for the peak period and new suppliers will not be introduced during this time. The normal supplier selection process will continue. The contract management system component 600 and IAM (Identity Authorization Management) may manage this process onboarding process. Suppliers may be identified 30 days prior to start date. If a supplier has not been onboarded by their start date, they may be put through the onboarding process and continue as a peak supplier for that month and may receive email and manual updates until completely onboarded.

The onboarding process may include the following steps: a supplier is assigned an accounts payable (APEX) ID; suppliers communication method is determined; supplier information is imported to a cloud system; servers are configured to file transfers between suppliers and USPS; sand suppliers are given access to logistics gateway component 500 and trained.

The auctions may be utilized to support all trips originating at a PDC, STC or NDC and delivering to another PDC, STC, NDC, THS, or a destination's associated Annex. The surface planners managing the auctions may receive communication via a web based application and/or TOPS 206 load entry process notifying them of the extra load and load details that they need to send to the freight auction component 700 for auction.

The surface planners may upload prebuilt load templates with freight auction load data into the transportation management system 202. This may include one or multiple extra network loads. These loads may be automatically sent to the freight auction component 700 via the JS for the suppliers to start the bid process.

Several types of auctions may be utilized in the freight auction component 700 such as a base contract auction or an adjusted contract auction. In a base contract auction, a supplier may only accept a load based on the price previously specified through the appropriate contract in transportation management system 202. Loads sent to the freight auction component 700 may be made available for bidding within a series of pre-defined rounds, with bids being assessed at the end of each round. Thus, in the case of a base contract auction, a bidding round may be terminated immediately if a load is accepted by the preferred supplier. In an adjusted contract auction, a supplier can accept a load based on a proposed adjustment to the price specified through the appropriate contract in transportation management system 202. This proposed adjustment could be a discount or a surcharge depending on current market conditions.

Figure 15:
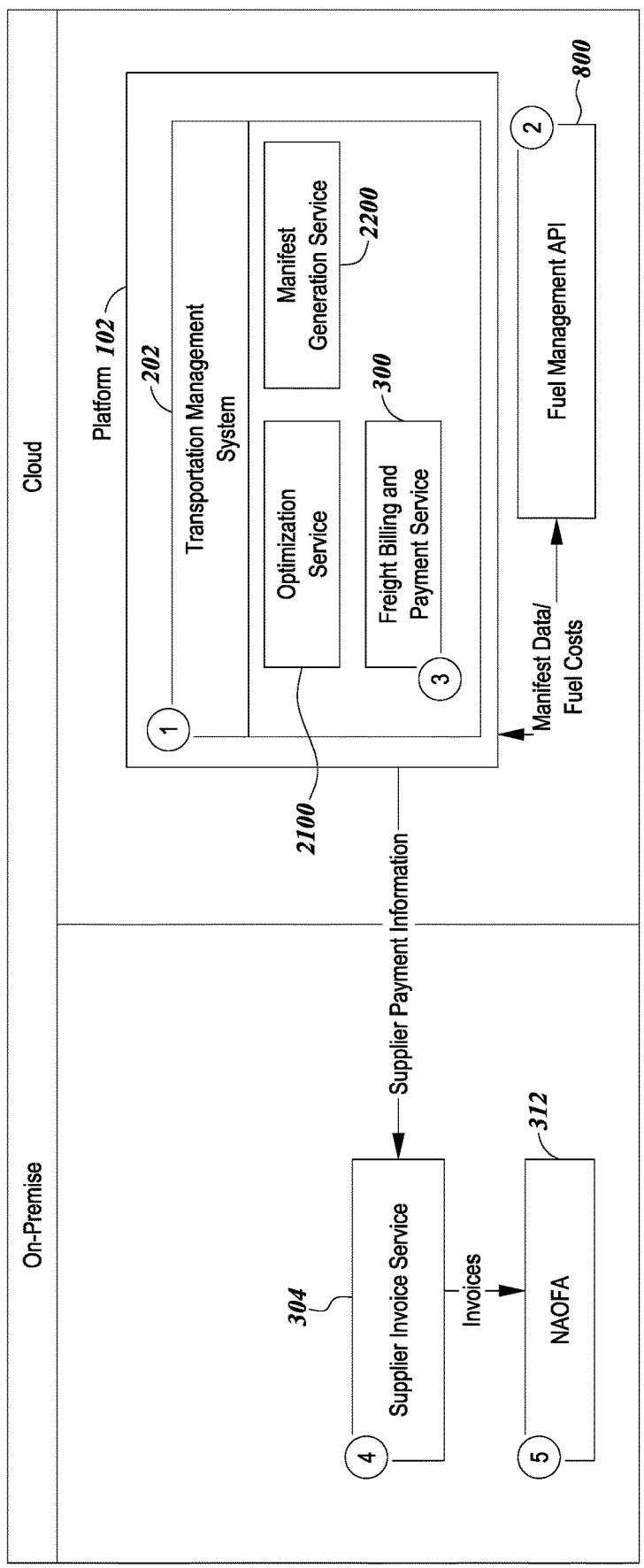
FIG. 15 is a process flow diagram including a fuel management component of an ILE.

FIG. 15 is a process flow diagram including the fuel management component 800 of the ILE and its associated fuel management API. The fuel management component 800 serves to accurately compensate supplier fuel reimbursement based on day-of, location-based fuel rates.

The fuel management component 800 communicates with the transportation management system 202 which in turn communicates with the supplier invoice service 304. The supplier invoice service 304 further communicates with NAOFA 312. The fuel management component 800 API provides fuel surcharge indexes based on state, region, or nation to transportation management system 202. The freight payment component 800 service includes the daily fuel surcharge rate in the invoice calculations. The transportation management system 202 provides the daily invoice to the supplier invoice service 304 and the supplier invoice service 304 provides the daily invoice to the NAOFA 312.

The fuel management component 800 service utilizes contract information and provides fuel cost for each contract segment for solicitations, contract awards, renewals, and modifications. Further, the fuel management component 800 service can compute the fuel rate charges for USPS surface transportation trips across the infrastructure of the USA and has the batch processing capabilities to calculate fuel cost for a single transportation segment of a given trip. The fuel management component 800 service supports multiple fuel types including gasoline, diesel, ethanol, and natural gas and their associated fluctuating costs. Further, the fuel management component 800 service can identify and calculate fuel charges across all contract segments, as for instance, for each leg within each trip. The fuel management component 800 service further accounts for state and local taxes when providing the total cost breakdown. Further, the system may deliver fuel price data via an API or data extract format. The fuel management component 800 service may provide access to USPS transportation suppliers with the fuel cost calculations and specifications. The ability to compute, analyze, and apply fuel rate charges may be done in mass, such as for 10,000 to 25,000 active contracts. Further, the fuel management component 800 service allows for vendor access to fuel data and reporting features.

While not shown here, the surface visibility component (e.g. 900) encompasses both surface and yard visibility duties. SV receives arrival and departure scans for trailer movements and sends these scans to the yard management system (YMS). YMS and yard visibility (YV) track trailer movements through data entry into the YMS device and SV mobile application (e.g. 404) scanner. YMS creates automated dispatches for trailer movements and generates pad movement reports. YV is a module of SV and is used to track trailer moves within a yard at any SV enabled site. YV is updated via GPS information and received SV scans.

SV provides visibility of USPS assets as they move through the surface transportation network. Data is collected by SV at the handling unit level (sacks, trays, tubs) to track mail through the site and entire transportation network. Handling units are tracked from the time of the initial breakdown, as they move through the plant via containers, and as well as on or off trailers. The collected data provides utilization, real-time dock status, induction information for mailers, and tracking information for USPS customers. Employees may utilize wireless handheld devices to capture key events and get confirmation they are placing the handling unit into the correct container and if the container is loaded into the correct truck. In addition, a wireless Personal Data Assistant (PDA) may provide expeditors with near real-time data to understand which trucks are about to leave, which containers are already loaded, and which containers are ready for dispatch but have yet to be loaded. Data collected is also used to forward an electronic manifest to down line facilities.

SV may predict estimated arrival time by trip leg based or based on received trailer scans. Once a scan for a trip leg takes place, SV adds the difference in minutes to the remaining arrival time for the leg if the scan occurs later than planned. The updated estimated arrival time is displayed on the SV scanner device and the SV web app for users. SV does not adjust arrival times based on GPS data. SV does not receive live traffic data or live weather data to adjust estimated arrival times.

SV calculate aggregated trip on time performance (OTP) based on TCSS provided contract schedules and inbound/outbound scan events. Departure and arrival scans are compared to the planned schedule and the resulting OTP scores are displayed with SV Web, exportable to Excel, and made available for consumption by the IV QLIK dashboard. SV enables the execution of transportation changes in the form of extra trip creation, but those actions may be defined manually without guidance from an optimization system. SV may enable users to enact transportation changes as a result of delays or other identified anomalies. SV users can add extra trips to satisfy additional demand or manually cancel legs or the entire trip through both the SV scanner and the SV Web application.

GPS data from PVS trips may be passed to ETA for visualization. Geofence break events based on GPS data may be sent to SV for future enhancements to OTP calculations and passive data collection initiatives.

SV may associate geo-fence break events to trips and logs this as an event in SV. At an individual trip level this can be analyzed to identify if a trip was on-time or late. SV receives manifest information for PVS trips from VITAL, and HCR trips from TOPS and TCSS, and matches these trips against the scans within the facility. SV also receives geofence break events from ETA and matches these against the trip schedule. Consumer applications can subscribe to SV data events in MQ topics.

Figure 16:
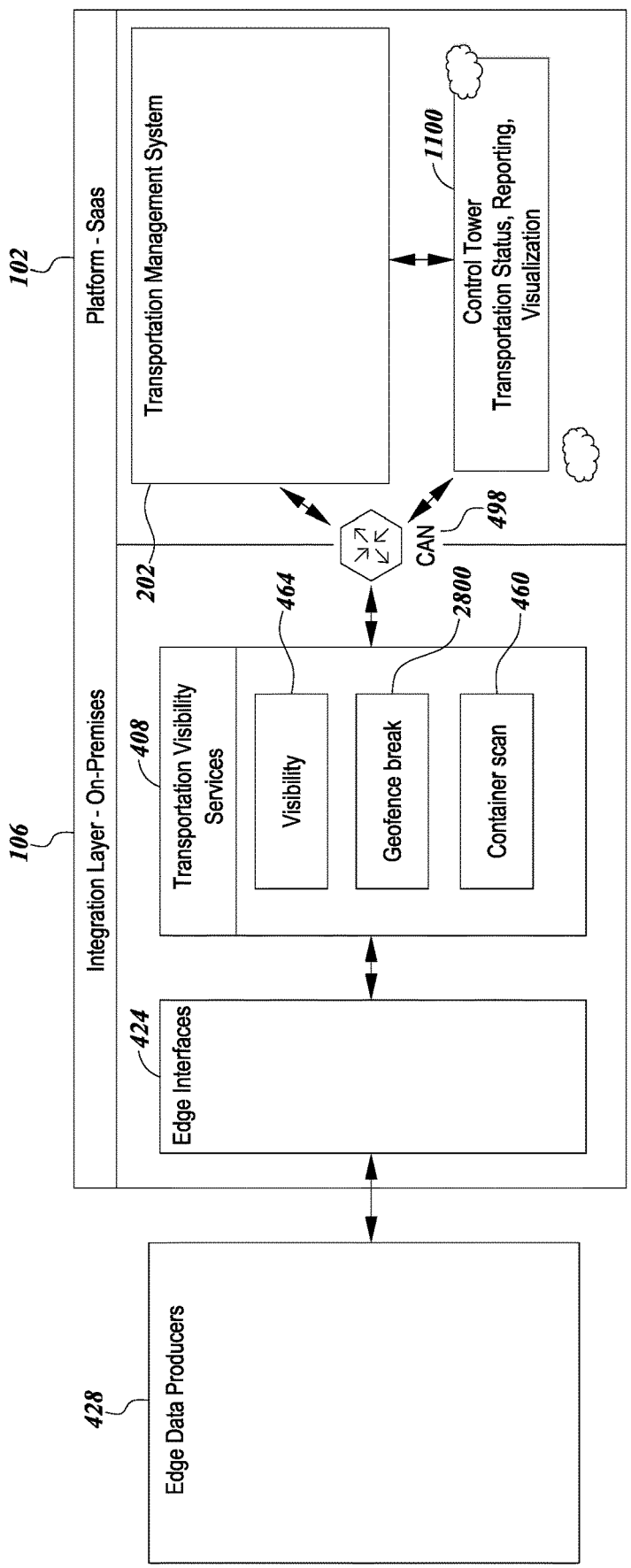
FIG. 16 is a diagram of the integration of an integrated control tower system within an ILE.

FIG. 16 is a diagram of the integration of the integrated control tower component 1100 of the ILE and shows the network connection between premise 106 and cloud platform 102 resources via a cloud agnostic network or CAN 498.

Edge data 428 producers funnel data to the edge interfaces 424 which in turn communicate with the transportation visibility service 408. The transportation visibility service 408 which is located on-premise 106, communicates with the transportation management system 202 and the integrated control tower component 1100, both of which are on the platform 102, via CAN 498.

The edge data producers 428 may include applications such as the PVS mobile application which handles PVS GPS data, the MVA-TV application which handles MVA-TV and PVS data, and OrbComm & CalAmp GPS devices which handle PVS and HCR GPS data. The edge interfaces 424 may include a security interface, an event broker interface, and the notification hub 450.

The transportation visibility service 408 provides an asset location data stream, which includes location data such as GPS breadcrumbs, to the integrated control tower component 1100. The transportation visibility service 408 also provides a data stream for geofence break events to the integrated control tower component 1100. The SMIP 704 may provide the integrated control tower component 1100 with user-relationship data, such as supplier ID, trailer ID, and GPS device ID, for providing authorization constraints.

The integrated control tower component 1100 serves as an end-to-end virtual control center to view, read, and act on real-time information across the transportation and processing networks. The integrated control tower component 1100 provides real-time network monitoring, predictive anomaly detection, and prescriptive resolution recommendations. The solution provides proactive issue alerts and a remediation platform that is integrated with the transportation management system 202. The solution is available across workstation, tablet, and mobile form factors.

The integrated control tower component 1100 predicts estimated arrival time by utilizing the initial transportation management system 202 planned arrival times for the trip and updates that time as a dynamic estimated arrival time based on scan data, GPS, traffic, and weather data while the moves occur. Integrated control tower component 1100 takes the latitude and longitude values from the GPS data to map the latest trip status on the integrated control tower component 1100 web app and mobile device for users to access.

The integrated control tower component 1100 may calculate OTP based on static and dynamic schedules from the transportation management system 202, scan events, and GPS data. OTP can be calculated based on scan or GPS events based on the business requirements. The dashboards within the analytics module are customizable for each user based on location and KPI preferences and the grid reports can be exported to Excel.

The integrated control tower component 1100 provides the user with recommendations to mitigate current or predicted transportation delays. Users are presented with trips at risk of missed scheduled delivery times and recommendation for "resolution" to maintain on-time performance or minimize overall impact to the network. The "resolution" functionality presents transportation options such as mode change, expedition, or cancellation that are reviewed and confirmed by only authorized users with the interface.

The integrated control tower component 1100 is integrated with the transportation management system 202 and the user can act in the system and notify all relevant stakeholders of the change. Users can choose to cancel a trip as an option and send the trip for re-optimization in the transportation management system 202. Resolution triggers can update within the transportation management system 202 and which automatically processes required operational changes in SV or SAMS 208 and the freight payment component 800.

The integrated control tower component 1100 can integrate with scan and GPS data via API or subscription to present trailer location and estimated time of arrival. Dashboards may display trailer information to the container-level and highlight status of ETA relative to planned schedule. ETA may be calculated based on GPS data and routing services that include real-time traffic data. The same dashboards can provide visibility into the air transportation network.

According to certain embodiments, the integrated control tower component 1100 has central communication functionality in the form of a situation room to resolve delayed trips. A situation room can be created for the specific at-risk trip so the right stakeholders can work together via chat in real time to unanimously determine the next course of action for the trip. This next course of action may be a mode change, expedite, or cancellation of the trip. The situation room may create a notification for the stakeholders to join either from the web portal or through the LCT mobile application. This streamlined process reduces USPS's dependency on phone calls and emails to resolve at-risk trips and maintains data consistency across the network.

The integrated control tower component 1100 tracks changes in real time. Trips may have audit logs that track all changes made to the trip and are easily accessible for viewing by the user. The displayed attributes of the trip may all be configurable to the user so only pertinent information for the trip's audit log is presented. As recalculations are done for timestamps or trip attributes change, all changes may be tracked for review. The audit log data may also power and enable the ability to run historical trends on logged trip data.

The integrated control tower component 1100 web app interface enables users to create and save custom filters to view trips specific to a user's area of focus both on a US map view or a grid-style view. Individual USPS transportation managers can have custom views in the integrated control tower component 1100 specific to the P&DCs they oversee which allows them to focus on at-risk trips that affect their daily operations. The integrated control tower component 1100 has alert functionality for users to receive push notifications when trip events such as an opened "situation room" or a delayed trip is taking place. Through the integrated control tower component 1100 web app or mobile application, the user may have all relevant alerts centralized. Alerts can be customized to a user's needs so only relevant alerts may be raised based on a user-defined threshold or criteria, minimizing the need for active network monitoring.

The integrated control tower component 1100 can integrate with air carriers who have lanes established with the Federal Aviation Administration (FAA) to graphically depict air transit statuses in the system. The integrated control tower component 1100 may receive data feeds transmitted through the Official Airline Guide (OAG) from the eligible air carriers making the integrated control tower component 1100 a centralized repository for moves beyond just surface transportation. The integrated control tower component 1100 may utilize the integration with the transportation management system 202, anomaly detection algorithms, and a front-end communication platform to manage transportation delays or other issues to resolution.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount, depending on the desired function or desired result.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed:

1. A system comprising:
    a cloud-based platform comprising one or more processors configured to:
    receive real-time locational data, including global positioning system breadcrumb data of one or more vehicles in a distribution network;
    ingest the global positioning system breadcrumb data for the one or more vehicles in the distribution network;
    match the breadcrumb data for the one or more vehicles to a device identifier on a vehicle;
    generate a vehicle tracking event in response to matching the breadcrumb data for the one or more vehicles to the device identifier;
    retrieve a plurality of geofences associated with a plurality of facilities and a plurality of delivery points;
    determine, based on the vehicle tracking event, one or more geofence breaks for the one or more vehicles; and
    generate, based on the global positioning breadcrumb data and the geofence breaks, vehicle visibility data;
    an integrated control tower component, comprising of software, in communication with the one or more processors, the integrated control tower component configured to:
    receive the vehicle visibility data; and
    predict and detect transportation anomalies within the distribution network based at least in part on the received vehicle visibility data; and
    a transportation management system, comprising of a second one or more processors, in communication with the integrated control tower component and the one or more processors, wherein the transportation management system is configured to:
    receive the vehicle visibility data from the one or more processors;
    identify a transportation anomaly based at least in part on the vehicle visibility data;
    dynamically generate a revised one or more vehicle transportation routes based on the transportation anomalies and the real-time location data; and
    cause an autonomous vehicle to navigate to a facility associated with the transportation anomaly.

2. The system of claim 1, wherein the transportation management system comprises a freight auction system in communication with the transportation management system, and wherein the transportation management system is configured to dynamically generate the revised one or more vehicle transportation routes by automatically initiating an additional freight auction in the freight auction system.

3. The system of claim 1, further comprising a fuel management component, comprising of software, the fuel management component configured to generate a fuel status for the one or more vehicles, and wherein the transportation management system is configured to:
    receive the fuel status for the one or more vehicles; and
    dynamically generate the revised one or more transportation routes further based on the received fuel status.

4. The system of claim 3, wherein the fuel management component generates an alert when the fuel status for the one or more vehicles indicates that a fuel level of the one or more vehicles is low.

5. The system of claim 1 further comprising a GPS tracking system in communication with the one or more processors, the GPS configured to generate the global positioning system breadcrumb data for the one or more vehicles.

6. The system of claim 1, further comprising a workforce management component, comprising of software, configured to dynamically assign one or more drivers to the transportation routes, and wherein the transportation management system is further configured to:
    receive the assigned one or more drivers from the workforce management component; and
    dynamically generate the revised one or more vehicle transportation routes further based on the assigned one or more drivers.

7. The system of claim 6, wherein the one or more drivers is an autonomous vehicle.

8. The system of claim 6, wherein the transportation management system is further configured to cause the workforce management component to identify an additional driver for the dynamically generated revised one or more transportation routes.

9. The system of claim 1, wherein the one or more processors are further configured to track asset movement at and between transportation sites.

10. The system of claim 9, wherein the control tower component is configured to identify the transportation anomaly by identifying a missing vehicle arrival or a late vehicle arrival based on the vehicle visibility data.

11. The system of claim 1, wherein the integrated control tower component is configured to monitor the one or more processors.

12. The system of claim 1, wherein the transportation management system plans and optimizes logistical operations for vehicle routes, processing and delivery facilities, and transportation vehicles.

13. A method of transportation management, the method comprising:
- ingesting, by one or more processors of a cloud-based platform, global positioning system breadcrumb data for one or more vehicles in a distribution network;
- matching, by the one or more processors of the cloud-based platform, the breadcrumb data for the one or more vehicles to a device identifier on a vehicle;
- generating, by the one or more processors of the cloud-based platform, a vehicle tracking event in response to matching the breadcrumb data for the one or more vehicles to the device identifier;
- retrieving, by the one or more processors of the cloud-based platform, a plurality of geofences associated with a plurality of facilities and a plurality of delivery points;
- determining, by the one or more processors of the cloud-based platform and based on the vehicle tracking events, one or more geofence breaks for the one or more vehicles;
- generating, by the one or more processors of the cloud-based platform and based on the global positioning breadcrumb data and the geofence breaks, vehicle visibility data;
- detecting, by an integrated control tower component comprising of software, one or more transportation anomalies within a distribution network based at least in part on the vehicle visibility data;
- identifying, by one or more processors of a transportation management system, the one or more transportation anomalies;
- receiving, by the one or more processors of the transportation management system, the vehicle visibility data;
- dynamically generating, by the one or more processors of the transportation management system, a revised one or more vehicle transportation routes based on the transportation anomaly, and the vehicle visibility data; and
- causing, by the one or more processors of the transportation management system, an autonomous vehicle to navigate to a facility associated with the transportation anomaly.

14. The method of claim 13, wherein dynamically generating the revised one or more vehicle transportation routes further comprises automatically initiating an additional freight auction in a freight auction system.

15. The method of claim 13, further comprising:
- generating a fuel status for one or more vehicles; and
- dynamically generating the revised one or more transportation routes further based on the fuel status.

16. The method of claim 15, wherein at least one of the one or more vehicles is an autonomous vehicle.

17. The method of claim 13, wherein the integrated control tower component is a software object configured to monitor the one or more processors of the cloud-based platform.

18. The method of claim 13, further comprising:
- receiving assigned one or more drivers from a workforce management system; and
- dynamically generating the revised one or more vehicle transportation routes further based on the received assigned one or more drivers.

* * * * *